(12) United States Patent
Kim et al.

(10) Patent No.: US 11,681,024 B2
(45) Date of Patent: Jun. 20, 2023

(54) IMAGING DEVICE AND IMAGE SENSOR

(71) Applicant: SAMSUNG ELECTRONICS CO., LTD., Suwon-si (KR)

(72) Inventors: Dae Yun Kim, Asan-si (KR); Min Sun Keel, Seoul (KR); Yeo Myung Kim, Seoul (KR); Hyun Surk Ryu, Hwaseong-si (KR); Myung Han Bae, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/947,644

(22) Filed: Sep. 19, 2022

(65) Prior Publication Data
US 2023/0009187 A1    Jan. 12, 2023

Related U.S. Application Data

(63) Continuation of application No. 16/597,434, filed on Oct. 9, 2019, now Pat. No. 11,454,711.

(30) Foreign Application Priority Data

Mar. 26, 2019   (KR) ........................ 10-2019-0034179

(51) Int. Cl.
*G01S 7/4863*    (2020.01)
*G01S 7/4865*    (2020.01)
(Continued)

(52) U.S. Cl.
CPC .......... *G01S 7/4863* (2013.01); *G01S 7/4816* (2013.01); *G01S 7/4865* (2013.01); *G01S 7/497* (2013.01);
(Continued)

(58) Field of Classification Search
CPC .... G01S 7/4863; G01S 7/4816; G01S 7/4865; G01S 7/497; G01S 17/36; G01S 7/4914;
(Continued)

(56) References Cited

U.S. PATENT DOCUMENTS 6,580,496 B2   6/2003 Bamji et al.
7,852,464 B2  12/2010 Kuijk et al.
(Continued)

FOREIGN PATENT DOCUMENTS

JP    10-210370 A    8/1998
JP    2017-32342 A   2/2017
(Continued)

OTHER PUBLICATIONS

Communication dated May 26, 2020 from the European Patent Office in application No. 20152070.7.
(Continued)

*Primary Examiner* — Seung C Sohn
(74) *Attorney, Agent, or Firm* — Sughrue Mion, PLLC

(57) ABSTRACT

An imaging device is described which, in some examples, includes general pixels and phase difference pixels. The general pixels, when operated by control signals, receive light from a subject and generate currents or voltages that are measured; a depth is estimated based on the measurements. The phase difference pixels generate currents based on a switched charge source. Data obtained from the currents generated by the phase difference pixels is used to adjust the control signals and thereby improve an accuracy of the depth estimation.

14 Claims, 29 Drawing Sheets

(51) Int. Cl.
*G01S 7/497* (2006.01)
*G01S 17/36* (2006.01)
*G01S 7/481* (2006.01)
*H04N 25/77* (2023.01)
*H04N 25/79* (2023.01)
*H04N 25/704* (2023.01)

(52) U.S. Cl.
CPC ........... *G01S 17/36* (2013.01); *H04N 25/704* (2023.01); *H04N 25/77* (2023.01); *H04N 25/79* (2023.01)

(58) Field of Classification Search
CPC ... G01S 7/4915; G01S 17/894; H04N 25/704; H04N 25/77; H04N 25/79; H04N 25/50; H04N 25/70; H04N 25/59; H04N 25/705; H04N 25/745
See application file for complete search history.

(56) References Cited

U.S. PATENT DOCUMENTS

| | | | |
|---|---|---|---|
| 8,587,771 B2 | 11/2013 | Xu et al. | |
| 8,767,189 B2 | 7/2014 | Mase et al. | |
| 9,041,916 B2* | 5/2015 | Oh | H04N 25/771 356/5.1 |
| 9,167,230 B2 | 10/2015 | Min et al. | |
| 9,214,492 B2 | 12/2015 | Van Der Tempel et al. | |
| 9,250,714 B2 | 2/2016 | Hiromi et al. | |
| 9,621,868 B2 | 4/2017 | Kim et al. | |
| 11,378,690 B2* | 7/2022 | Keel | G01S 7/491 |
| 2010/0308209 A1 | 12/2010 | Buettgen et al. | |
| 2013/0201167 A1 | 8/2013 | Oh et al. | |
| 2014/0347537 A1 | 11/2014 | Hamada | |
| 2015/0130904 A1 | 5/2015 | Bae et al. | |
| 2017/0041589 A1 | 2/2017 | Patil et al. | |
| 2017/0222076 A1 | 8/2017 | Furrer et al. | |
| 2017/0276773 A1 | 9/2017 | Tokuda | |
| 2018/0011195 A1 | 1/2018 | Perry et al. | |
| 2018/0031676 A1 | 2/2018 | Sadhu | |
| 2018/0267623 A1 | 9/2018 | Hiromi et al. | |

FOREIGN PATENT DOCUMENTS

| | | | |
|---|---|---|---|
| KR | 10-2015-0054568 A | 5/2015 | |
| KR | 10-2018-0113525 A | 10/2018 | |

OTHER PUBLICATIONS

Office Action dated Feb. 20, 2023 by the Korean Intellectual Property Office in corresponding Korean Application No. 10-2019-0034179.

* cited by examiner

IMAGING DEVICE AND IMAGE SENSOR

CROSS-REFERENCE TO RELATED APPLICATION

This application is a Continuation of U.S. application Ser. No. 16/597,434 filed Oct. 9, 2019, which claims benefit of priority to Korean Patent Application No. 10-2019-0034179 filed on Mar. 26, 2019 in the Korean Intellectual Property Office, the disclosures of the above are incorporated herein by reference in their entirety.

BACKGROUND

The present application relates to an imaging device and an image sensor.

An image sensor is a semiconductor-based sensor receiving light to produce an electrical signal, which may include a pixel array having a plurality of pixels, a logic circuit for driving the pixel array and generating an image, and the like. In recent years, in addition to a conventional image sensor, research on an imaging device in which a light source for outputting an optical signal of a specific wavelength band is combined with an image sensor has been actively studied.

SUMMARY

An aspect of the present application is to improve performance of an imaging device generating a depth map using a phase difference between a received optical signal and an output optical signal.

According to an aspect of the present application, an imaging device includes: a light source operated by a light control signal; and a pixel array including a plurality of pixels, each of the plurality of pixels including a pixel circuit generating an electrical signal based on an electric charge, wherein general pixels among the plurality of pixels comprise a photodiode generating the electric charge in response to a received optical signal output from the light source and reflected by a subject, and phase difference detection pixels among the plurality of pixels comprise an electric charge-supplying source outputting the electric charge, and a switch element being turned on and turned off by a switch control signal to supply the electric charge to the pixel circuit.

According to an aspect of the present application, an image sensor includes: a pixel array including a plurality of pixels, at least a portion of the plurality of pixels including a first pixel circuit having a first photogate connected to a pixel node, a second pixel circuit having a second photogate connected to the pixel node, a switch element connected to the pixel node, and an electric charge-supplying source connected to the switch element; and a controller configured to input a first photo-control signal to the first photogate, input a second photo-control signal having a phase difference of 180 degrees from the first photo-control signal to the second photogate, and turn on and turn off the switch element to supply an electric charge to the pixel node.

According to an aspect of the present application, an image sensor includes: a pixel array including first pixels disposed along a first photo-control line, and second pixels disposed along a second photo-control line, each of the first pixels and the second pixels including a photodiode generating an electric charge, and a pixel circuit generating an electrical signal using the electric charge, a clock driver having a first output terminal outputting a first clock signal, and a second output terminal outputting a second clock signal; and a controller configured to connect the second output terminal to the second photo-control line during a first frame period, connect the first output terminal to the second photo-control line during a second frame period following the first frame period, and correct a phase of a clock signal input to the first photo-control line and the second photo-control line, based on data obtained in the first frame period and the second frame period.

In some embodiments, an imaging device is provided, including: a light source configured to be operated by a light control signal; and a pixel array including a plurality of pixels, wherein the plurality of pixels comprises a plurality of general pixels, wherein the plurality of general pixels includes a first general pixel, wherein the first general pixel includes a first pixel circuit and a second pixel circuit, wherein the first general pixel includes a photodiode, wherein the photodiode is configured to generate a first electric charge in response to a received optical signal output from the light source and reflected by a subject, wherein the first pixel circuit is configured to generate a first electrical signal based on the first electric charge, and wherein the plurality of pixels comprises a plurality of phase difference detection pixels, wherein the plurality of phase difference detection pixels includes a first phase difference detection pixel, wherein the first phase difference detection pixel is connected to an electric charge-supplying source, wherein the electric charge-supplying source is configured to output a second electric charge, wherein the first phase difference detection pixel includes a switch element, wherein the switch element is configured to be turned on and turned off by a switch control signal, wherein a third pixel circuit of the first phase difference detection pixel is configured to generate a second electrical signal based on the second electric charge.

In some embodiments of the imaging device, the first phase difference detection pixel comprises a second pixel node configured to receive the second electric charge, wherein one terminal of the switch element is connected to the second pixel node, and the photodiode is connected to a first pixel node.

In some embodiments of the imaging device, the plurality of general pixels is disposed in an array form in accordance with a row direction and a column direction, and the plurality of phase difference detection pixels is disposed in the row direction.

In some embodiments of the imaging device, the plurality of phase difference detection pixels is disposed in a first position in the column direction.

In some embodiments of the imaging device, the plurality of phase difference detection pixels is disposed in a first position and in a second position, and the second position is adjacent to the first position in the column direction.

In some embodiments of the imaging device, the plurality of phase difference detection pixels is disposed in a first position and in a second position separated from the first position in the column direction.

In some embodiments of the imaging device, the plurality of general pixels is disposed in an array form in accordance with a row direction and a column direction, the first phase difference detection pixel is disposed separately from a second phase difference detection pixel, the plurality of phase difference detection pixels includes the second phase difference detection pixel, and the first and second phase difference detection pixels are surrounded by a portion of the general pixels.

In some embodiments of the imaging device, the switch control signal is the same as the light control signal.

In some embodiments of the imaging device, the first pixel circuit and the second pixel circuit have a same structure, the first pixel circuit comprises a first photogate configured to be controlled by a first photo-control signal, and the second pixel circuit comprises a second photogate configured to be controlled by a second photo-control signal, the second photo-control signal has a phase difference of 180 degrees from the first photo-control signal, and the imaging device is configured to: input the first electric charge to the first pixel circuit w % ben the first photogate is turned on, and input the first electric charge to the second pixel circuit when the second photogate is turned on.

In some embodiments of the imaging device, the switch control signal is the same as one of the first photo-control signal and the second photo-control signal.

In some embodiments of the imaging device, the plurality of phase difference detection pixels is disposed in a row direction, the first phase difference detection pixel and a second phase difference detection pixel adjacent in the row direction are grouped into one group, and the plurality of phase difference detection pixels includes the second phase difference detection pixel.

In some embodiments of the imaging device, the switch control signal of the first phase difference detection pixel and the switch control signal of the second phase difference detection pixel are the same as one of the first photo-control signal and the second photo-control signal of the first phase difference detection pixel.

In some embodiments of the imaging device, a portion of the plurality of phase difference detection pixels is disposed in a first position in a column direction intersecting the row direction, and a remainder of the plurality of phase difference detection pixels is disposed in a second position, adjacent to the first position in the column direction, and the portion of the plurality of phase difference detection pixels disposed in the first position and the remainder of the plurality of phase difference detection pixels disposed in the second position are grouped in different manners to each other.

Some embodiments of the imaging device include a control logic configured to use data obtained from the plurality of phase difference detection pixels to correct a phase difference error between the first photo-control signal and the second photo-control signal.

In some embodiments of the imaging device, the control logic is configured to use data obtained from the plurality of general pixels to generate a depth map including distance information between each of the plurality of general pixels and the subject.

In some embodiments of the imaging device, the light control signal and the switch control signal are pulse width modulation (PWM) signals.

In some embodiments of the imaging device, the plurality of phase difference detection pixels further comprises a light blocking layer blocking the received optical signal.

Also provided in some embodiments, is an image sensor including a pixel array including a plurality of pixels, wherein a first plurality of the plurality of pixels includes a first pixel circuit having a first photogate connected to a pixel node, a second pixel circuit having a second photogate connected to the pixel node, a switch element connected to the pixel node, and an electric charge-supplying source connected to the switch element, wherein the first photogate includes a first transistor and the second photogate includes a second transistor, wherein a second plurality of the plurality of pixels includes a third pixel circuit, wherein the third pixel circuit includes a photodiode; and a controller configured to: input a first photo-control signal to the first photogate, input a second photo-control signal having a phase difference of 180 degrees from the first photo-control signal to the second photogate, and turn on and turn off the switch element to supply an electric charge to the pixel node.

In some embodiments of the image sensor, the controller is further configured to: generate a light control signal driving a light source outputting an optical signal, and input the light control signal to the switch element as a switch control signal to turn on and turn off the switch element.

In some embodiments of the image sensor, the controller inputs one of the first photo-control signal and the second photo-control signal to the switch element as a switch control signal to turn on and turn off the switch element.

In some embodiments of the image sensor, the controller is further configured to adjust a phase of at least one of the first photo-control signal and the second photo-control signal, based on data obtained from at least one portion of the plurality of pixels.

In some embodiments of the image sensor, the first pixel circuit is associated with a first lens, the third pixel circuit is associated with a second lens, a first light blocking layer is configured to block light from passing through the first lens, and the second lens is configured to allow a passage of light.

In some embodiments of the image sensor, the first pixel circuit is not associated with a photodiode.

In some embodiments of the image sensor, the electric charge-supplying source includes a current mirror, wherein the current mirror includes two transistors configured with a first gate of the first transistor connected to a second gate of the second transistor, and a reference current is configured to flow through the first transistor.

In some embodiments of the image sensor, the data includes first data corresponding to a first waveform area, second data corresponding to a second waveform area, third data corresponding to a third waveform area, and fourth data corresponding to a fourth waveform area, wherein the controller is further configured to: obtain the first data from the first pixel circuit after a first frame time, obtain the second data from the second pixel circuit after the first frame time, obtain the third data from the first pixel circuit after a second frame time, obtain the fourth data from the second pixel circuit after the second frame time, estimate a phase error as proportional to at least one of: i) the fourth data minus the third data and ii) the second data plus a predetermined constant minus the first data, and adjust the phase of at least one of the first photo-control signal and the second photo-control signal based on the estimated phase error.

Also provided in some embodiments, is an alternative image sensor including a pixel array including first pixels disposed along a first photo-control line, and second pixels disposed along a second photo-control line, each of the first pixels including a first photodiode configured to generate a first electrical charge and each of the second pixels including a second photodiode configured to generate a second electric charge, and a pixel circuit configured to generate an electrical signal using the first electric charge or the second electric charge; a clock driver, wherein the clock driver includes a first output terminal and a second output terminal, wherein the clock driver is configured to output a first clock signal at the first output terminal, and a second output signal at the second output terminal; and a controller configured to: connect the second output terminal to the second photo-control line during a first frame period, connect the first output terminal to the second photo-control line during a second frame period following the first frame period, and correct a phase of a clock signal input to the first photo-control line and the second photo-control line, based on data obtained in the first frame period and the second frame period.

In some embodiments of the alternative image sensor, the controller is further configured to, during the first frame period and the third frame period following the second frame period: connect the first output terminal to the first photo-control line, and connect the second output terminal to the second photo-control line.

In some embodiments of the alternative image sensor also includes a column selection circuit configured to connect one of the first output terminal and the second output terminal to the second pixels, in response to a command from the controller.

In some embodiments of the alternative image sensor, the column selection circuit comprises a multiplexer.

In some embodiments of the alternative image sensor, the second frame period repeats at predetermined periods.

In some embodiments of the alternative image sensor, the controller is further configured to, when the image sensor enters a wakeup mode, set the first frame period and the second frame period.

In some embodiments of the alternative image sensor, the controller is further configured to set the first pixels as dummy pixels during the second frame period.

In some embodiments of the alternative image sensor, each of the first photo-control line and the second photo-control line comprises a pair of photo-control lines, and the clock driver is configured to input clock signals to the pair of photo-control lines, wherein the clock signals have a phase difference with respect to each other.

In some embodiments of the alternative image sensor the phase difference is one of 90 degrees and 180 degrees.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred embodiments of the present application will be described with reference to the accompanying drawings.

Figure 1:
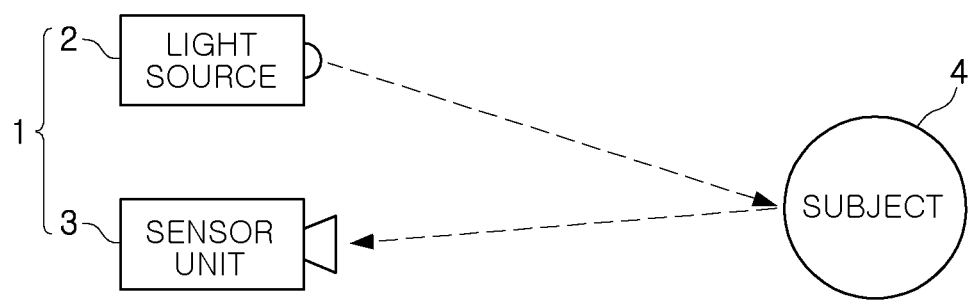
FIG. 1 is a block diagram schematically illustrating an imaging device according to an embodiment of the present application.

FIG. 1 is a block diagram schematically illustrating an imaging device according to an embodiment of the present application.

Referring first to FIG. 1, an imaging device 1 according to an embodiment of the present application may include a light source 2 and a sensor unit 3. The light source 2 may include a light emitting element that outputs an optical signal of a specific wavelength band. For example, the light source 2 may include a vertical cavity surface emitting laser (VCSEL), a light emitting diode (LED), or the like, as the light emitting element. The light source 2 may include a plurality of light emitting elements arranged in an array form, and an optical element may be further provided on a path of an optical signal output from the plurality of light emitting elements. The optical signal output from the light source 2 may be an optical signal in an infrared wavelength band.

The optical signal output from the light source 2 may be reflected by a subject 4, and the optical signal reflected by the subject 4 may be input into the sensor unit 3, as a received optical signal. The sensor unit 3 may include a pixel array having pixels that generate an electrical signal in response to the received optical signal, a controller that generates an image using the electrical signal generated by the pixel array, and the like. For example, the image generated by the controller may be a depth map including distance information of the subject 4 and its surrounding environment.

In an embodiment of the present application, the sensor unit 3 may have, in addition to a function of generating the depth map, a proximity sensing function of sensing a presence of the subject 4 adjacent to the imaging device 1, a distance measuring function of calculating a distance between the subject 4 and the imaging device 1, and the like. The sensor unit 3 may be realized as an image sensor including a pixel array having a plurality of pixels, a controller for controlling the pixel array, and the like. As the received optical signal output from the light source and reflected by the subject is accurately detected by the sensor unit 3, the above functions may be realized more accurately.

In an example, each of the plurality of pixels may operate with a plurality of clock signals having a phase difference from each other. The phase of the clock signals input to the plurality of pixels may be determined based on a light control signal input to the light source 2. Operation performance of the imaging device 1 may be improved by accurately determining a phase difference between the clock signals input to the plurality of pixels and the light control signal.

For example, at least one of the clock signals input to the plurality of pixels may have the same phase as the light control signal. Actually, a phase difference may occur between the clock signal and the light control signal due to various factors, and the distance information determined by the sensor unit 3 with respect to the subject 4 positioned at the same distance due to the phase difference may be different from each other. In an embodiment of the present application, performance of the imaging device 1 may be improved by detecting and compensating for unintended phase differences between clock signals input to a plurality of pixels and light control signal input to the light source 2, or between clock signals.

Figure 2A:
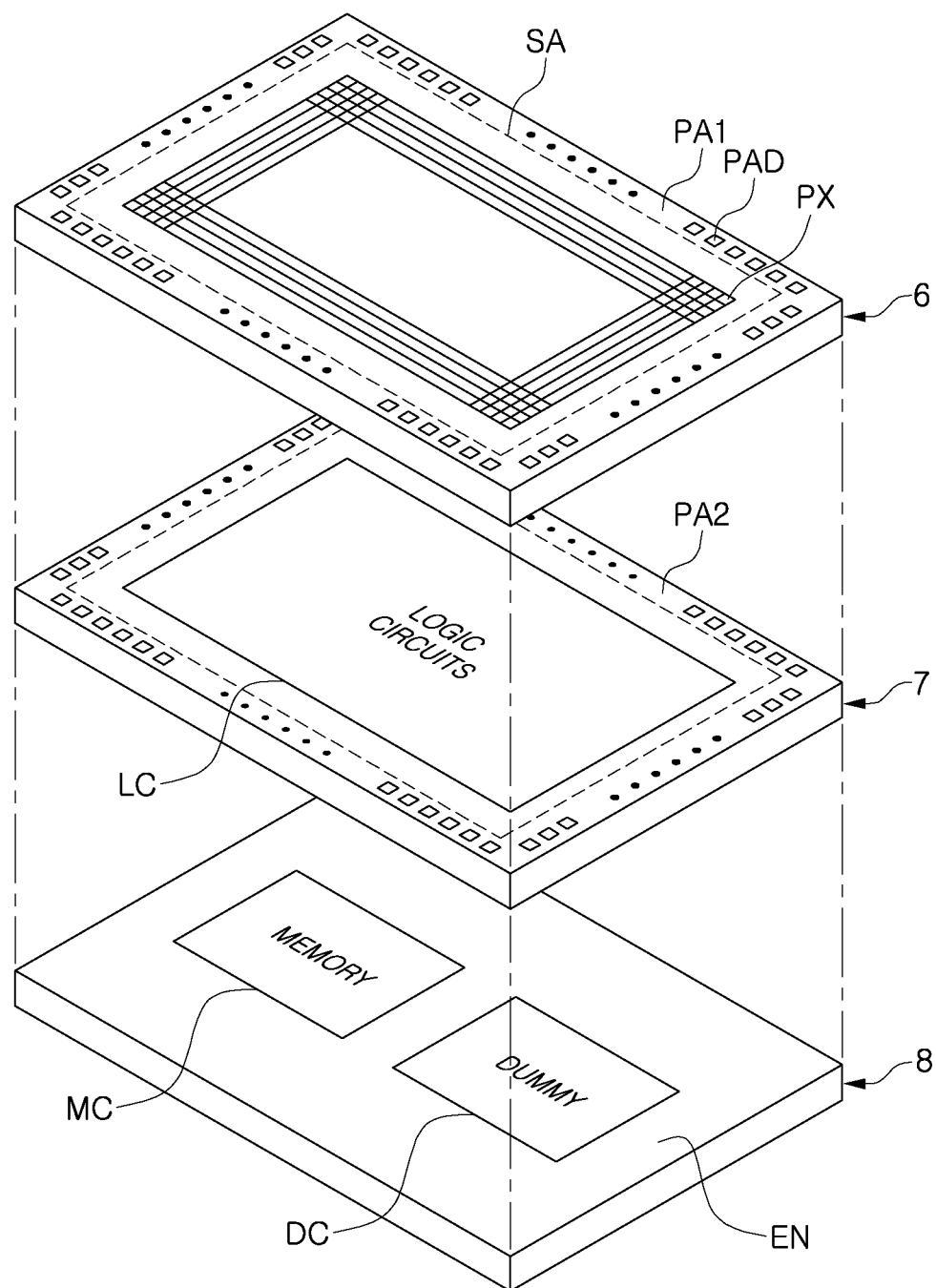
FIGS. 2A and 2B are views schematically illustrating an image sensor according to an embodiment of the present application.
Figure 2B:
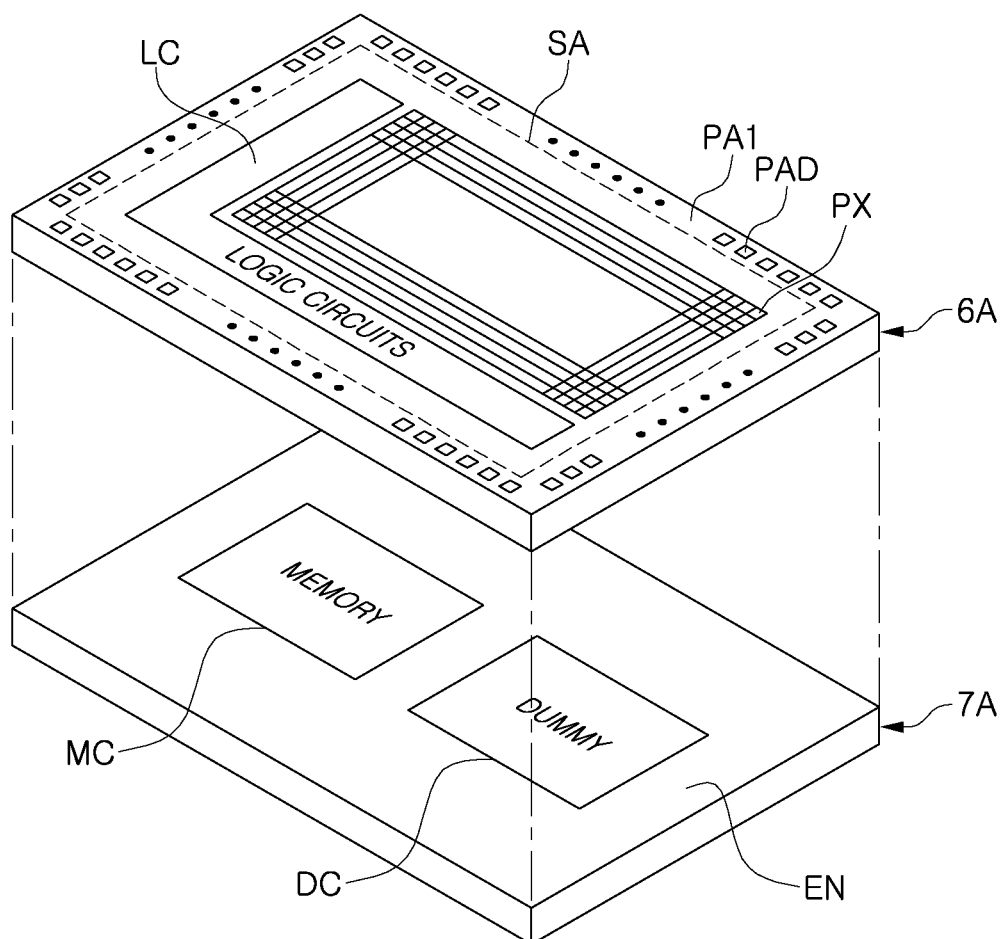

FIGS. 2A and 2B are views schematically illustrating an image sensor according to an embodiment of the present application.

Image sensors 5 and 5A according to embodiments illustrated in FIGS. 2A and 2B may be employed as the sensor unit 3 of the imaging device 1 described with reference to FIG. 1. Referring first to FIG. 2A, an image sensor 5 according to an embodiment of the present application may include a first layer 6, a second layer 7 provided below the first layer 6, and a third layer 8 provided below the second layer 7. The first layer 6, the second layer 7, and the third layer 8 may be stacked in a direction perpendicular to each other. In an embodiment, the first layer 6 and the second layer 7 may be laminated to each other on a wafer level, and the third layer 8 may be attached to a lower surface of the second layer 7 on a chip level. The first to third layers 6, 7, and 8 may be provided as a single semiconductor package.

The first layer 6 may include a sensing area SA provided with a plurality of pixels PX, and a first pad area PA1 provided around the sensing area SA. The first pad area PA1 may include a plurality of upper pads PAD, and the plurality of upper pads PAD may be connected to pads provided on a second pad area PA2 of the second layer 7, and to a logic circuit LC, through a via, or the like.

Each of the plurality of pixels PX may include a photodiode for receiving light to generate an electric charge, a pixel circuit for processing the electric charge generated from the photodiode, and the like. The pixel circuit may include a plurality of transistors for outputting a voltage corresponding to the electric charge generated from the photodiode.

The second layer 7 may include a plurality of elements providing the logic circuit LC. The plurality of elements included in the logic circuit LC may provide circuits for driving a pixel circuit provided in the first layer 6, for example, a clock driver, a read-out circuit, an arithmetic circuit, and a timing controller. The plurality of elements included in the logic circuit LC may be connected to the pixel circuit through the first and second pad areas PA1 and PA2. The logic circuit LC may obtain a reset voltage and a pixel voltage from the plurality of pixels PX to generate a pixel signal.

In an embodiment, at least one of the plurality of pixels PX may include a plurality of photodiodes disposed on the same level in a semiconductor substrate. Pixel signals generated from the electric charges of each of the plurality of photodiodes may have a phase difference from each other, and the logic circuit LC may provide an autofocus function, based on a phase difference of pixel signals generated from a plurality of photodiodes included in a single pixel PX.

The third layer 8 provided below the second layer 7 may include a memory chip MC, a dummy chip DC, and a protection layer EN sealing the memory chip MC and the dummy chip DC. The memory chip MC may be a dynamic random access memory (DRAM) or a static random access memory (SRAM), and the dummy chip DC may not have a function of actually storing data. The memory chip MC may be electrically connected to at least a portion of the elements included in the logic circuit LC of the second layer 7 through bumps, and may store information necessary to provide an autofocus function. In an embodiment, the bumps may be micro-bumps.

Referring next to FIG. 2B, an image sensor 5A according to an embodiment of the present application may include a first layer 6A and a second layer 7A. The first layer 6A may include a sensing area SA provided with a plurality of pixels PX, a logic circuit LC provided with elements for driving the plurality of pixels PX, and a first pad area PA1 provided around the sensing area SA the logic circuit LC. The first pad area PA1 may include a plurality of upper pads PAD, and the plurality of upper pads PAD may include a memory chip MC provided in the second layer 7A, through a via, or the like. The second layer 7A may include a memory chip MC, a dummy chip DC, and a protection layer EN sealing the memory chip MC and the dummy chip DC.

Figure 3:
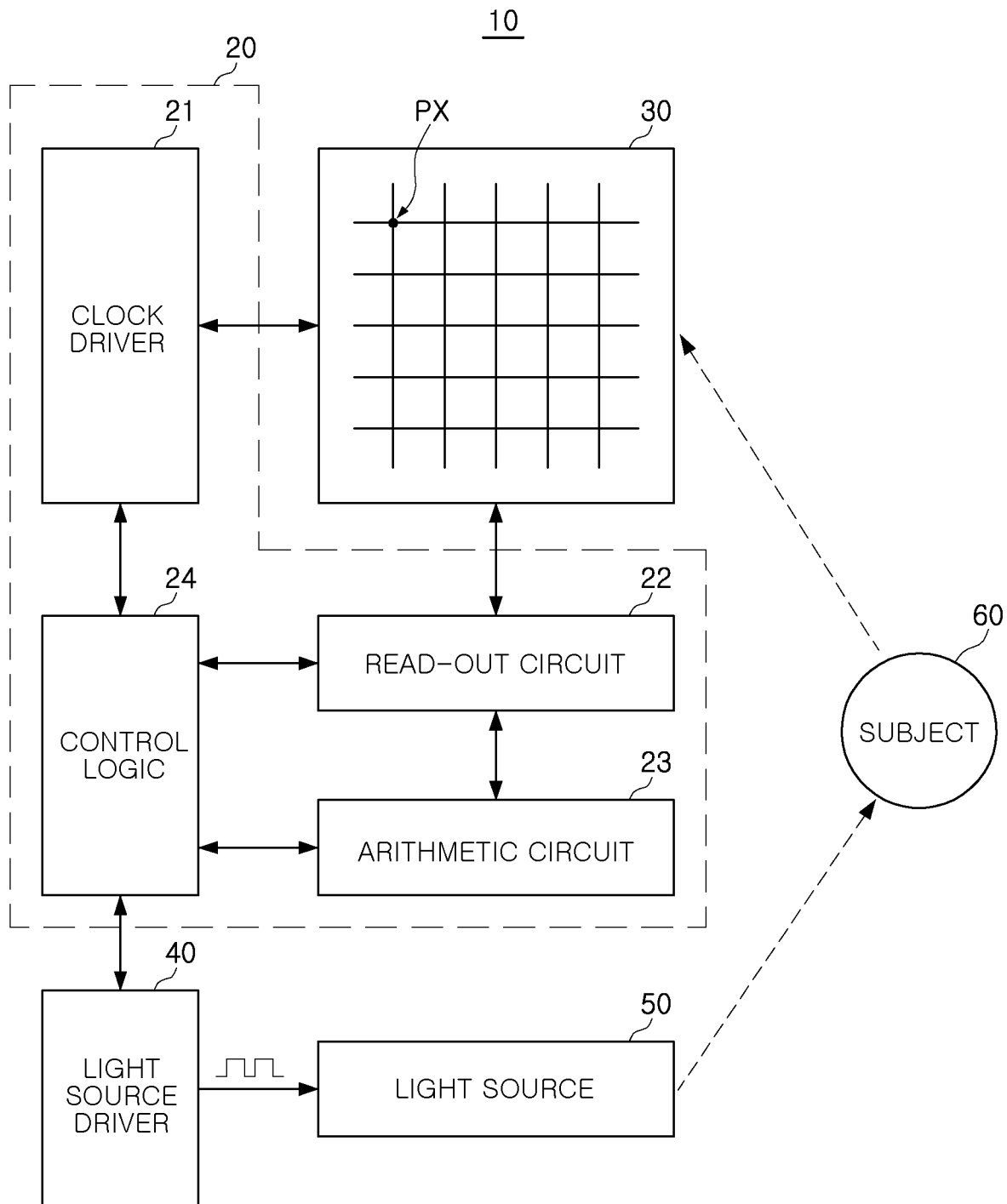
FIG. 3 is a block diagram schematically illustrating an imaging device according to an embodiment of the present application.

FIG. 3 is a block diagram schematically illustrating an imaging device according to an embodiment of the present application.

Referring to FIG. 3, an imaging device 10 may include a controller 20, a pixel array 30, a light source driver 40, a light source 50, and the like. The pixel array 30 may include a plurality of pixels PX disposed in an array form in accordance with a plurality of rows and a plurality of columns. Each of the plurality of pixels PX may include a photodiode generating an electric charge in response to an optical signal incident from a subject 60, a pixel circuit generating an electrical signal corresponding to the electric charge generated by the photodiode, and the like. For example, the pixel circuit may include a floating diffusion, a transfer transistor, a reset transistor, a driving transistor, a selection transistor, and the like. A configuration of the pixels PX may vary, depending on embodiments. As an example, each of the pixels PX may include an organic photodiode that may include an organic material, unlike a silicon photodiode, or may be implemented as digital pixels. When the pixels PX are implemented as digital pixels, each of the pixels PX may include a comparator, a counter converting output of the comparator into a digital signal and outputting the digital signal, and the like.

The controller 20 may include a plurality of circuits for controlling the pixel array 30. For example, the controller 20 may include a clock driver 21, a read-out circuit 22, an arithmetic circuit 23, a control logic 24, and the like. The clock driver 21 may drive the pixel array 30 in a first direction or a second direction. The first direction and the second direction may be directions in which the plurality of pixels PX are arranged in the pixel array 30. For example, the clock driver 21 may generate a transfer control signal input to a transfer gate of the pixel circuit, a reset control signal input to a reset gate, a selection control signal input to a selection gate, a photo control signal input to a photo gate, and the like. The first direction and the second direction may be defined in various ways. For example, the first direction may correspond to a row direction, and the second direction may correspond to a column direction.

The read-out circuit 22 may include a correlated double sampler (CDS), an analog-to-digital converter (ADC), and the like. The correlated double sampler may be connected to pixels PX selected by a clock signal supplied by the clock driver 21, through column lines, and may perform a correlated double sampling operation to detect a reset voltage and a pixel voltage. The analog-to-digital converter may convert the reset voltage and the pixel voltage detected by the correlated double sampler into a digital signal, and may transmit the digital signal to the arithmetic circuit 23.

The arithmetic circuit 23 may include a latch or buffer circuit, and an amplification circuit capable of temporarily storing a digital signal, and may process the digital signal received from the read-out circuit 22. The clock driver 21, the read-out circuit 22, and the arithmetic circuit 23 may be controlled by the control logic 24. The control logic 24 may include a timing controller for controlling operation timings of the clock driver 21, the read-out circuit 22, and the arithmetic circuit 23, an image signal processor for performing an image signal processing operation. In an embodiment, the arithmetic circuit 23 may be included in the control logic 24.

The control logic 24 may perform a signal process of data output from the read-out circuit 22 and the arithmetic circuit 23 to generate image data. For example, the image data may include a depth map. The control logic 24 may also control a distance between the subject 60 and the imaging device 10 using the data output from the read-out circuit 22 and the arithmetic circuit 23, or may recognize the subject 60 adjacent to the imaging device 10, in accordance with an operation mode of the imaging device 10. Alternatively, the arithmetic circuit 23 may generate a depth map, and the control logic 24 may also perform an image process of the depth map to improve image quality.

The imaging device 10 may include the light source 50 outputting an optical signal to the subject 60 to generate the depth map. The light source 50 may include at least one light emitting element, and may include, for example, a semiconductor chip in which a plurality of semiconductor light emitting elements may be arranged in an array form. The light source 50 may be operated by the light source driver 40. The light source driver 40 may be controlled by the controller 20.

In an embodiment, the light source driver 40 may generate a light control signal having pulse signal characteristics to drive the light source 50. The light source driver 40 may generate a light control signal by a pulse width modulation (PWM) signal in response to a control command of the controller 20, and may determine a frequency, a duty ratio, a repetition time period, and the like of the light control signal. For example, the controller 20 may synchronize at least one of clock signals that the clock driver 21 inputs to the pixel array 30, with a light control signal input to the light source 50. In an embodiment, the signal synchronized with the light control signal input to the light source 50 may be a photo-control signal that the clock driver 21 inputs to the photogate of the pixels PX. In some embodiments, a photogate is a transistor such as a field effect transistor (FET).

The pixels PX may receive the photo-control signal from output buffers included in the clock driver 21. For example, pixels PX connected to a single row line or pixels PX connected to a single column line may receive the same photo-control signal. Ideally, the photo-control signals output from the output buffers approximately simultaneously may not have a phase difference with respect to each other, but actually, a phase difference error may occur between the photo-control signals due to various factors. The phase difference error may also occur between the light control signal and the photo-control signal.

Embodiments of the present application may detect a phase difference error that unintentionally appears between photo-control signals, or between a photo-control signal and a light control signal, and compensate for the phase difference error. Therefore, performance of the imaging device 10 may be improved by increasing accuracy of data output by the pixels PX.

Figure 4:
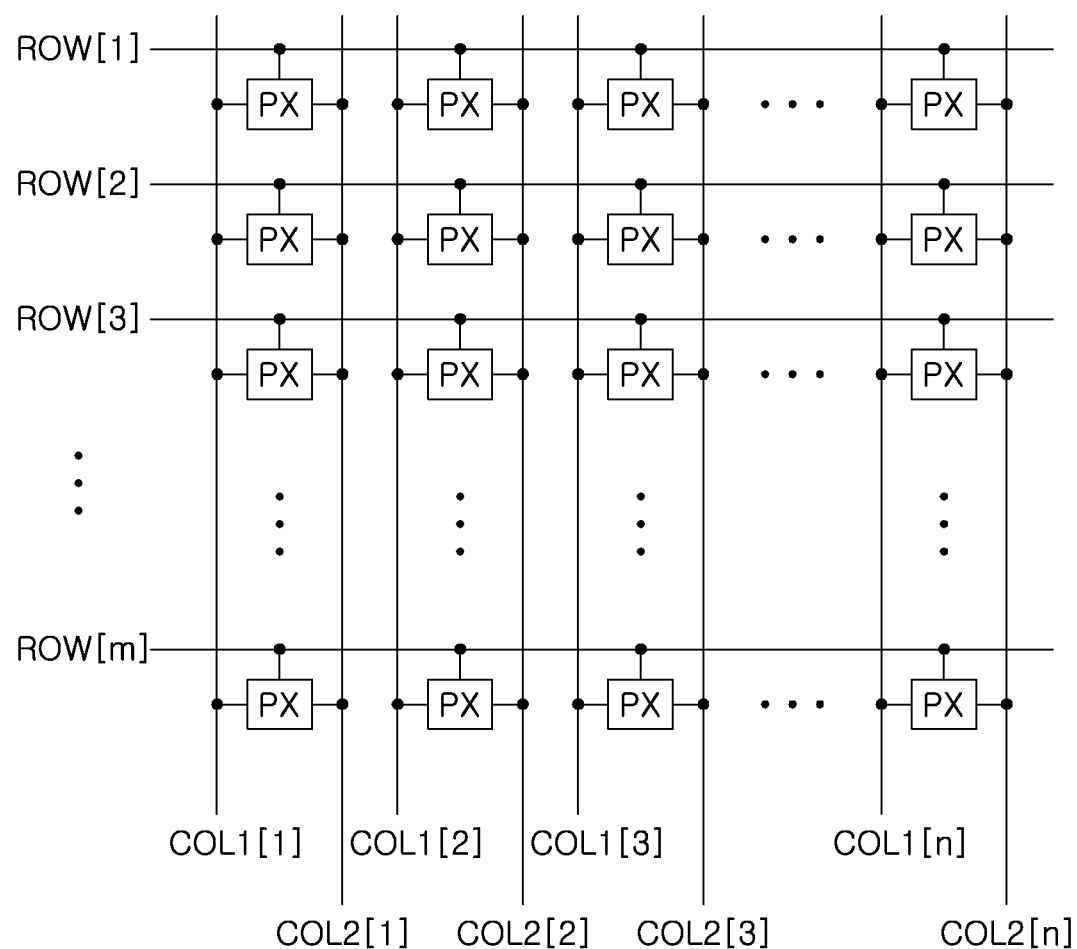
FIG. 4 is a view schematically illustrating a pixel array of an image sensor according to an embodiment of the present application.

FIG. 4 is a view schematically illustrating a pixel array of an image sensor according to an embodiment of the present application.

Referring to FIG. 4, a pixel array 30 according to an embodiment of the present application may include a plurality of pixels PX, and the plurality of pixels PX may be disposed at points in which a plurality of row lines ROW [1] to ROW [m] and a plurality of column lines COL1 [1] to COL1 [n], and COL2 [1] to COL2 [n] intersect. In an embodiment illustrated in FIG. 4, each of the plurality of pixels PX may be connected to one of the plurality of row lines ROW [1] to ROW [m]. Each of the plurality of pixels PX may be connected to one of a plurality of first column lines COL1 [1] to COL1 [n], and a plurality of second column lines COL2 [1] to COL2 [n]. According to embodiments, the number of row lines ROW [1] to ROW [m] and column lines COL [1] to COL [n] connected to each of the plurality of pixels PX may vary in different ranges. Extension directions of the row lines ROW [1] to ROW [m] connected to the plurality of pixels PX and the plurality of column lines COL1 [1] to COL1 [n], and COL2 [1] to COL2 [n] may be different from those illustrated in FIG. 4.

Each of the plurality of pixels PX may include a photodiode generating an electric charge in response to an optical signal received by the pixel array 30, and include a pixel circuit outputting an electrical signal using the electric charge generated by the photodiode. The pixel circuit may include a photogate for allowing the electric charge generated by the photodiode to move, a floating diffusion for accumulating an electric charge (in general the expression "a floating diffusion" may refer to "a floating diffusion portion" or "a floating diffusion region"), a transfer transistor connected between the floating diffusion and the photogate, a reset transistor for resetting the floating diffusion, a driving transistor for amplifying a voltage of the floating diffusion, a selection transistor for connecting the driving transistor to one of the column lines COL1 [1] to COL1 [n], and COL2 [1] to COL2 [n], and the like.

When the optical signal output from the light source is reflected by the subject to be incident on the pixel array 30, the photodiodes of each of the plurality of pixels PX may generate electric charges in response to the incident optical signal. The optical signal output from the light source, and the received optical signal reflected by the subject and incident on the pixel array 30 may have a phase difference related to a distance to the subject. In an embodiment, the imaging device may use the phase difference to determine the distance between the imaging device and the subject, or to sense proximity of the subject, to generate the depth map.

The imaging device may obtain electrical signals corresponding to electric charges generated during different integration times, through a plurality of first column lines COL1 [1] to COL1 [n] and a plurality of second column lines COL2 [1] to COL2 [n], connected to a plurality of pixels PX during a frame. For example, electrical signals may be obtained by turning on and off the transfer transistors included in each of the plurality of pixels PX using the transfer control signal having a phase difference of 180 degrees, through the first column lines COL1 [1] to COL1 [n] and the second column lines COL2[1] to COL2 [n].

Figure 5:
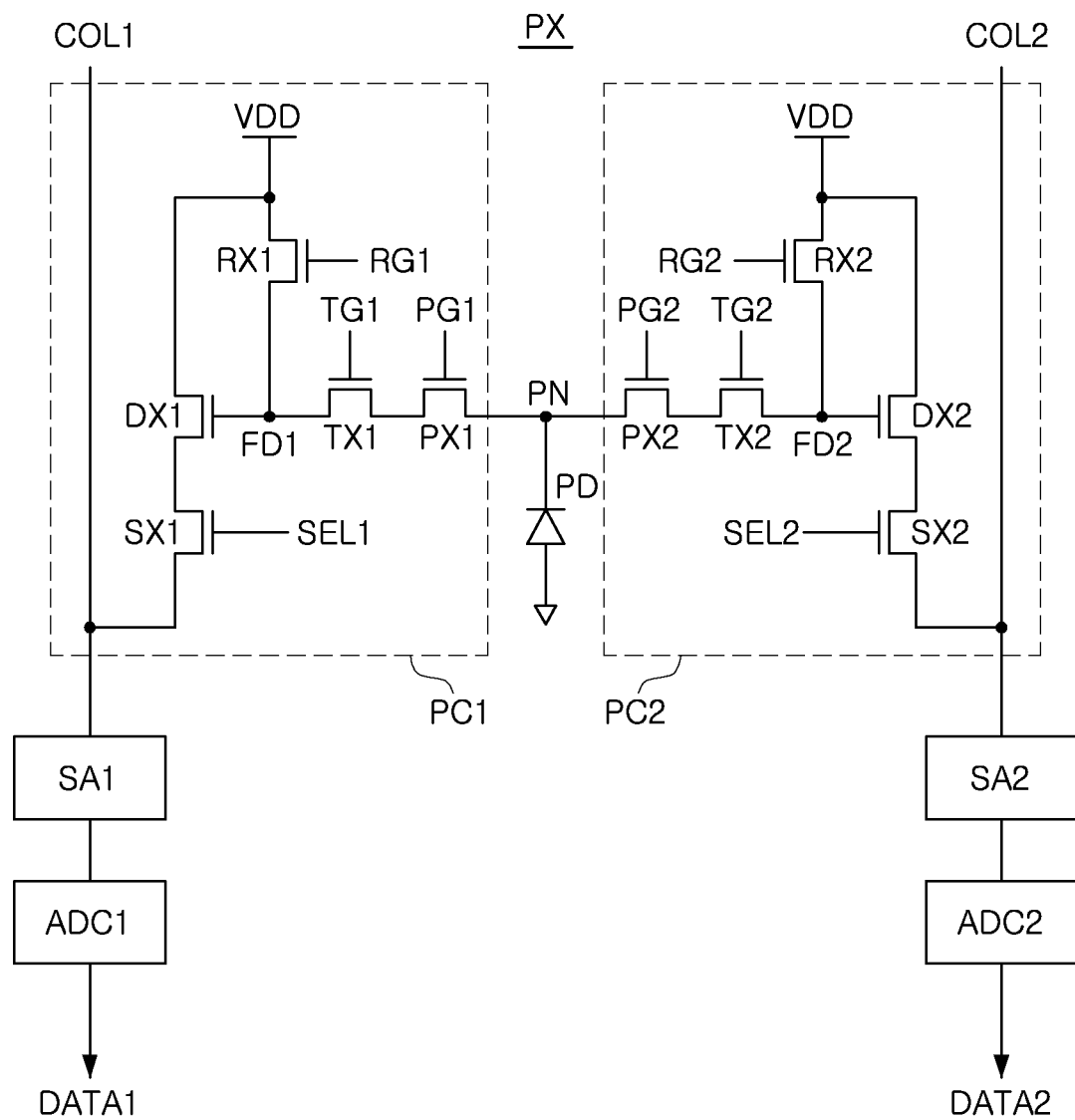
FIGS. 5 and 6 are circuit diagrams illustrating general pixels included in an image sensor according to an embodiment of the present application.
Figure 6:
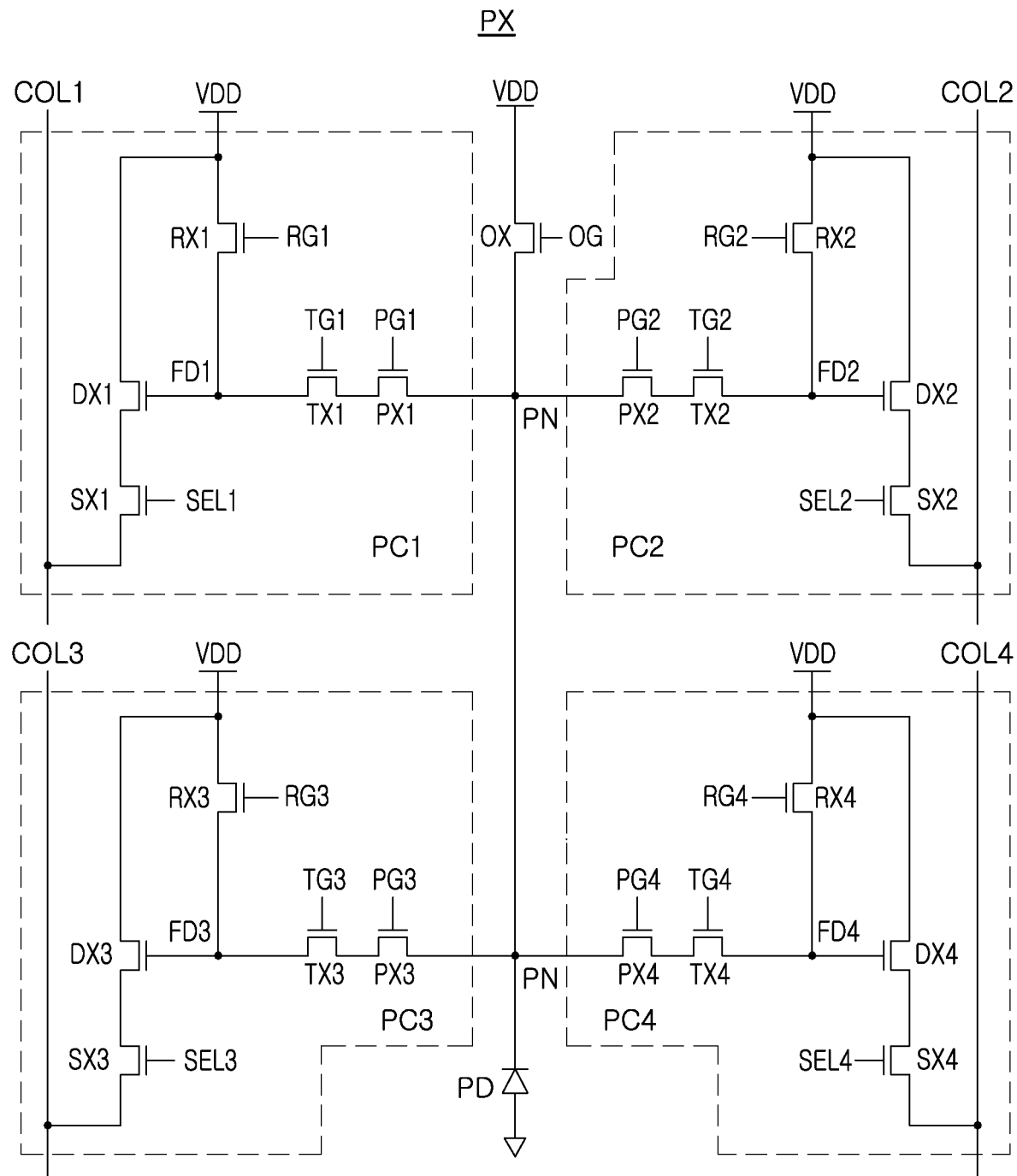

FIGS. 5 and 6 are circuit diagrams illustrating general pixels included in an image sensor according to an embodiment of the present application.

Referring to FIG. 5, a pixel PX of an imaging device according to an embodiment of the present application may include a photodiode PD generating an electric charge in response to an optical signal, and pixel circuits PC1 and PC2 outputting an electrical signal corresponding to the electric charge generated by the photodiode PD. The pixel circuits PC1 and PC2 may include a first pixel circuit PC1 and a second pixel circuit PC2. The first pixel circuit PC1 may be connected to a first sampling circuit SA1 and a first analog-to-digital converter ADC1 through a first column line COL, and the second pixel circuit PC2 may be connected to a second sampling circuit SA2 and a second analog-to-digital converter ADC2 through a second column line COL2.

The first pixel circuit PC1 may include a first phototransistor PX1 connected to the photodiode PD, a first transfer transistor TX1, a first floating diffusion FD1 accumulating an electric charge generated from the photodiode PD, and a plurality of first circuit elements RX1, DX1, and SX1. As used herein, a phototransistor includes a transistor. The plurality of first circuit elements RX1, DX1, and SX1 may include a first reset transistor RX1, a first driving transistor DX1, a first selection transistor SX1, and the like. The second pixel circuit PC2 may have a structure similar to that of the first pixel circuit PC1. Control signals TG1, RG1, and SEL1 for controlling the first transfer transistor TX1, the first reset transistor RX1, and the first selection transistor SX1 may be input by a row driver of the imaging device.

When the first reset transistor RX1 is turned on, a voltage of the first floating diffusion FD1 may be reset to a power supply voltage VDD, and the selection transistor SX1 may be turned on such that the first sampling circuit SA1 may detect a first reset voltage. During a first exposure time until the first reset transistor RX1 is turned off and the first transfer transistor TX1 is turned on, the photodiode PD may be exposed to light to generate an electric charge.

When the first transfer transistor TX1 is turned on, an electric charge generated in the photodiode PD and accumulated in the first phototransistor PX1 may be transferred to the first floating diffusion FD1. The first sampling circuit SA1 may detect a first pixel voltage in response to the turn on of the first selection transistor SX1. The first analog-to-digital converter may convert a difference between the first reset voltage and the first pixel voltage into first raw data DATA1 in a digital form.

An operation of the second pixel circuit PC2 may be similar to that of the first pixel circuit PC1. A second phototransistor PX2 may not be turned on at the same time as the first phototransistor PX1. Therefore, a second pixel voltage output from the second pixel circuit PC2 through the second column line COL2 may correspond to an electric charge generated by exposing the photodiode PD to light during a second exposure time different from the first exposure time. The second analog-to-digital converter ADC2 may convert a difference between a second reset voltage and the second pixel voltage into second raw data DATA2.

In an embodiment of the present application, an imaging device may operate in a global shutter mode. For example, after the first and second reset transistors RX1 and RX2 included in each of the pixels PX included in the imaging device are all turned on to reset the pixels PX simultaneously, the photodiode PD included in the pixels PX may be exposed to light during a predetermined exposure time to generate an electric charge. An amount of exposure time during which the photodiode PD is exposed to light may vary, depending on an operation mode of the imaging device. During the exposure time, clock signals having a complementary relation to each other may be input to the first phototransistor PX1 and the second phototransistor PX2, and the electric charge generated from the photodiode PD may be stored in at least one of the first phototransistor PX1 and the second phototransistor PX2. The clock signals input to the first phototransistor PX1 and the second phototransistor PX2 may be controlled by synchronizing with the light control signal input to the light source of the imaging device.

For example, during a first time, a first photo-control signal PG1 input to the first phototransistor PX1 may have the same phase as a light control signal, and a second photo-control signal PG2 input to the second phototransistor PX2 may have a phase difference of 180 degrees from a light control signal. Also, during a second time after the first time, the first photo-control signal PG1 may have a phase difference of 90 degrees from the light control signal, and the second transfer control signal TG2 may have a phase difference of 270 degrees from the light control signal. The image sensor may use the first raw data DATA1 and the second raw data DATA2 acquired during the first time, and the first raw data DATA1 and the second raw data DATA2 acquired during the second time, to recognize a subject or determine a distance to the subject. In an example, each of the first time and the second time may be a frame period of the image sensor.

Pixels PX adjacent to each other in a column direction in which the column lines COL1 and COL2 extend may share the first photo-control signal PG1 and the second photo-control signal PG2. In an embodiment, the first phototransistor PX1 included in each of the pixels PX adjacent to each other in the column direction may be connected to the first photo-control line, and may receive the same first photo-control signal PG1. Similarly, the second phototransistor PX2 included in each of the pixels PX adjacent to each other in the column direction may be connected to the second photo-control line, and may receive the same second photo-control signal PG2. For example, the first photo-control line and the second photo-control line may be lines extending in the column direction.

Referring to FIG. 6, in a pixel PX of an image sensor according to an embodiment of the present application, a plurality of pixel circuits PC1, PC2, PC3, and PC4 may be connected to a single photodiode PD. In an embodiment illustrated in FIG. 6, first to fourth pixel circuits PC1, PC2, PC3, and PC4 are illustrated to be connected to the photodiode PD. According to embodiments, the number thereof may vary in different ranges. The first to fourth pixel circuits PC1, PC2, PC3, and PC4 may have substantially the same structure as each other.

Operations of the first to fourth pixel circuits PC1, PC2, PC3, and PC4 may be similar to that described above with reference to FIG. 5. First to fourth phototransistors PX1, PX2, PX3, and PX4 included in the first to fourth pixel circuits PC1, PC2, PC3, and PC4 may operate in different phases, while the photodiode PD is exposed to light. For example, the first photo-control signal PG1 input to the first photo-transistor PX1 and the second photo-control signal PG2 input to the second photo-transistor PX2 may have a phase difference of 180 degrees from each other. A third photo-control signal PG3 and a fourth photo-control signal PG4 may have a phase difference of 180 degrees from each other, and the third photo-control signal PG3 may have a phase difference of 90 degrees from the first photo-control signal PG1. In an embodiment, the first to fourth photo-control signals PG1, PG2, PG3, and PG4 may have the same period as the light control signal, and may have a duty ratio smaller than the light control signal. For example, the duty ratios of the first to fourth photo-control signals PG1, PG2, PG3, and PG4 may be ½ of the duty ratio of the light control signal.

The image sensor may generate a depth map using pixel voltages obtained from electric charges stored in the first to fourth phototransistors PX1, PX2, PX3, and PX4 by the phase difference operation as described above. In the read-out operation, first data corresponding to the electric charge stored in the first phototransistor PX1 may be output through the first column line COL1, and second data corresponding to the electric charge stored in the second phototransistor PX2 may be output through the second column line COL2. Further, third data corresponding to the electric charge stored in the third phototransistor PX3 may be output through the third column line COL3, and fourth data corresponding to the electric charge stored in the fourth phototransistor PX4 may be output through the fourth column line COL4.

According to embodiments, the first pixel circuit PC1 and the third pixel circuit PC3 may be connected to a single column line, the second pixel circuit PC2 and the fourth pixel circuit PC4 may be connected to a single column line. In a similar manner to the above, the pixels PX disposed in the same position in the row direction and disposed adjacent to each other in the column direction may share the first to fourth photo-control signals PG1, PG2, PG3, and PG4.

Figure 7:
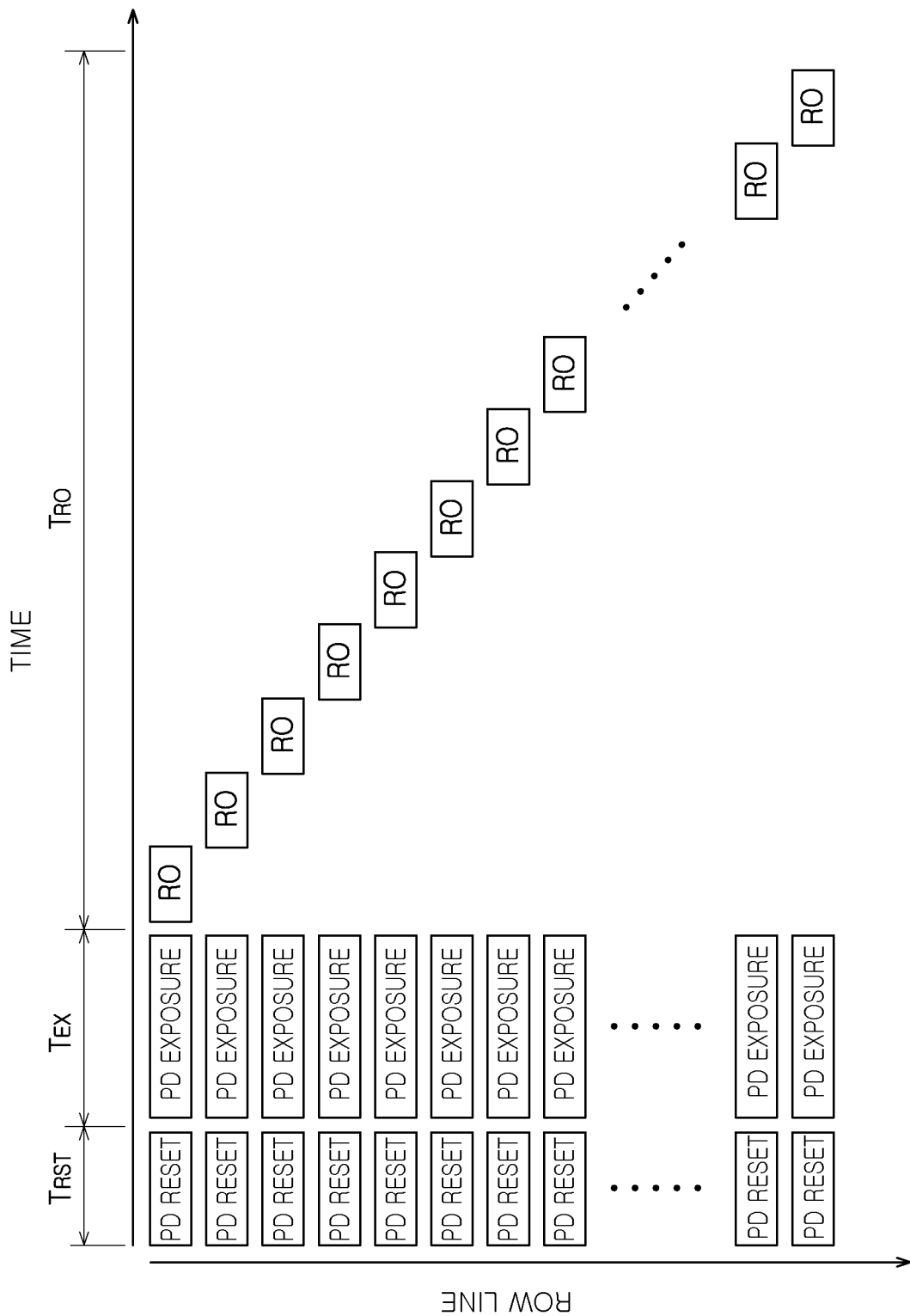
FIG. 7 is a view illustrating an operation of an image sensor according to an embodiment of the present application.

FIG. 7 is a view illustrating an operation of an image sensor according to an embodiment of the present application.

FIG. 7 is a view provided to explain an operation of global shutter of an image sensor. Referring to FIG. 7, photodiodes of a plurality of pixels included in a pixel array during a reset time $T_{RST}$ may be reset simultaneously. In an example, a clock driver may reset the photodiodes by turning on a reset transistor included in a pixel circuit to connect the photodiode to a predetermined power supply voltage.

When the photodiodes are reset, the photodiodes included in the plurality of pixels may be exposed to light during an exposure time $T_{EX}$ to generate an electric charge. As used herein "reset" may refer to establishing points within a circuit at a predetermined voltage. For example, the exposure time $T_{EX}$ may be determined by an operating environment of the image sensor, shutter speed, diaphragm value, and the like.

When the exposure time $T_{EX}$ elapses, the clock driver may scan a plurality of row lines connected to the plurality of pixels. A read-out circuit may perform a read-out operation for the plurality of pixels in sequence that the clock driver scans the plurality of row lines. The read-out circuit may read a reset voltage and a pixel voltage from each of the plurality of pixels during a read-out time $T_{RO}$.

In order for the read-out circuit to read the reset voltage and the pixel voltage during the read-out time $T_{RO}$, the electric charge generated by the photodiodes during the exposure time $T_{EX}$ may be stored in a storage area of the pixel circuit. In an example, the storage area may be a phototransistor of the pixel circuit. An electric charge stored in the storage area may move to a floating diffusion of the pixel circuit in response to the turn on of a transfer transistor. The read-out circuit may read the reset voltage of the plurality of pixels, before the transfer transistor is turned on, i.e., while the electric charge is stored in the storage area. The read-out circuit may read the pixel voltage of the plurality of pixels, after the transfer transistor is turned on by the clock driver to move the electric charge in the storage area to the floating diffusion.

FIGS. 8A, 8B, 9A, 9B, 10A and 10B are timing diagrams illustrating an operation of an image sensor according to an embodiment of the present application.

Figure 8A:
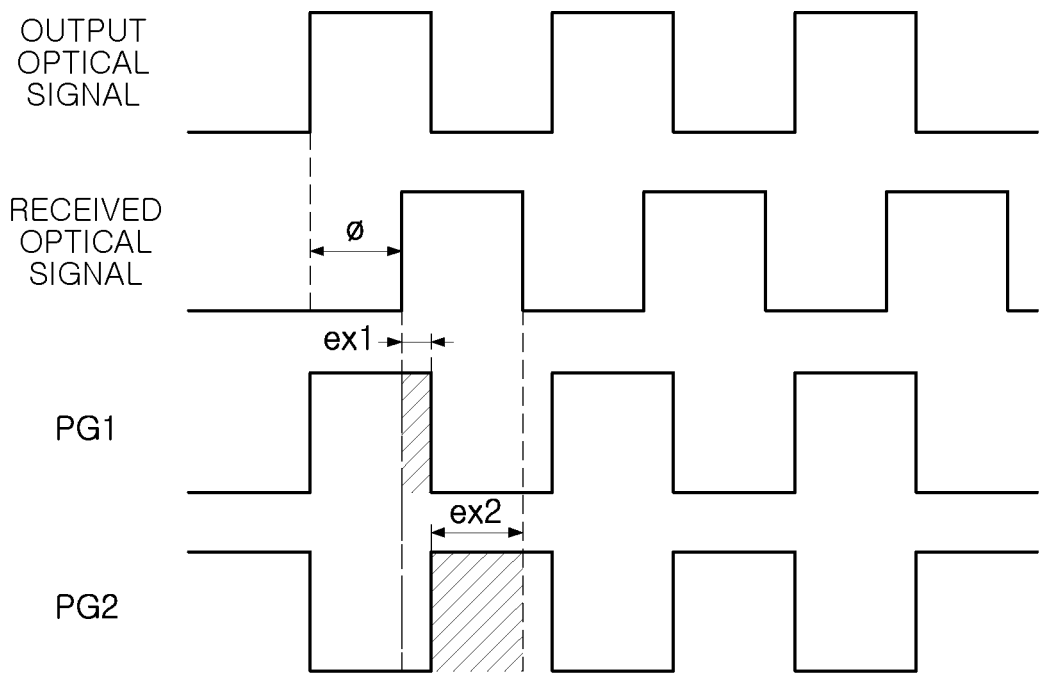
FIGS. 8A, 8B, 9A, 9B, 10A and 10B are timing diagrams illustrating an operation of an image sensor according to an embodiment of the present application.
Figure 8B:
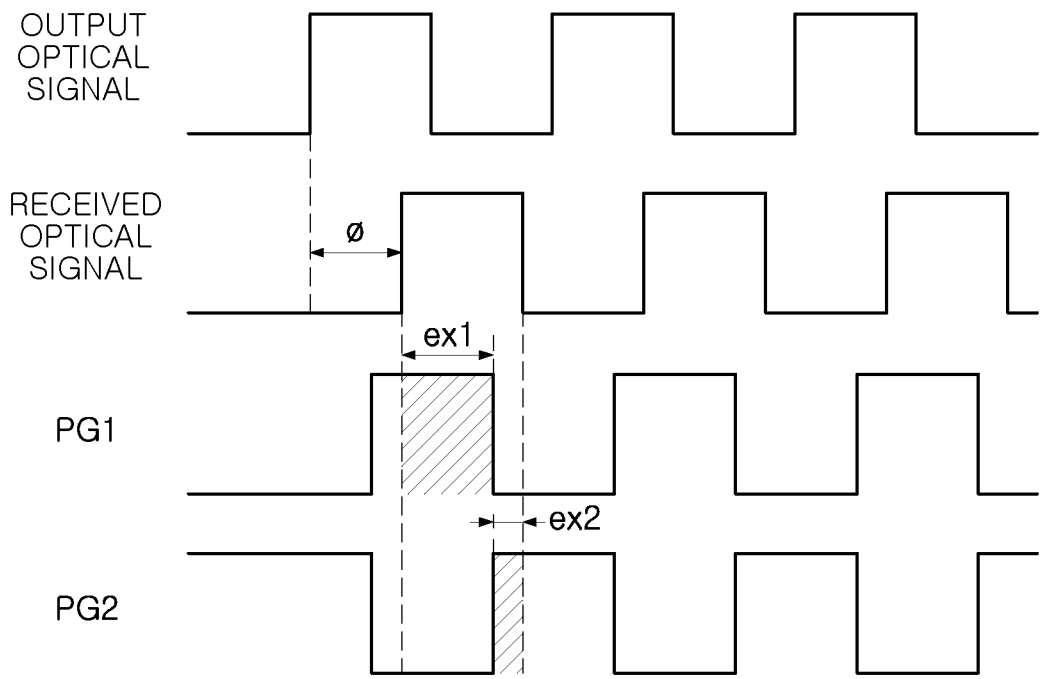

FIGS. 8A and 8B illustrate an output optical signal, a received optical signal, a first photo-control signal PG1, and a second photo-control signal PG2 during a first frame period and a second frame period. In embodiments illustrated in FIGS. 8A and 8B, an output optical signal may be an optical signal output from a light source that operates in a PWM manner, and may have the same period and duty ratio as a light control signal input to the light source. FIGS. 8A and 8B may be views illustrating the first photo-control signal PG1 and the second photo-control signal PG2, input to the pixels during an exposure time exposing a photodiode PD to light, after resetting the pixels simultaneously, in an imaging device operating in a global shutter mode.

Referring to FIG. 8A, an output optical signal, and a received optical signal generated by reflecting the output optical signal by a subject may have a phase difference (Ø). During a first frame period, a first photo-control signal PG1 may have a phase difference of 0 degree from the output optical signal, and a second photo-control signal PG2 may have a phase difference of 180 degrees from the output optical signal. Therefore, an electric charge generated from a photodiode PD during a first exposure time (ex1) may be accumulated in a first phototransistor controlled by the first photo-control signal PG1, and an electric charge generated from a photodiode PD during a second exposure time (ex2) may be accumulated in a second phototransistor controlled by the second photo-control signal PG2.

Next, referring to FIG. 8A, during a second frame period, a first photo-control signal PG1 may have a phase difference of 90 degrees from the output optical signal, a second photo-control signal PG2 may have a phase difference of 270 degrees from the output optical signal. Therefore, a first exposure time (ex1) and a second exposure time (ex2) in which a photodiode PD is exposed to light during the second frame period may be different from the first exposure time (ex1) and the second exposure time (ex2) during the first frame period, respectively. During the second frame period, the first exposure time (ex1) may be longer than the second exposure time (ex2).

When the exposure time ends, a controller of an imaging device may read a pixel voltage and a reset voltage from pixels included in a pixel array. For example, the controller of the imaging device may read the pixel voltage and the reset voltage in each of a first column line and a second column line connected to the pixel in accordance with a rolling method, and may calculate a difference therebetween. The difference between the pixel voltage and the reset voltage may be used as raw data.

The controller of the imaging device may determine a distance between the subject and the pixel by using the raw data obtained through the first column line and the second column line connected to the pixel in each of the first frame period and the second frame period. The controller of the imaging device may also generate a depth map using the distance between each of the pixels and the subject. For example, if raw data output through each of the first column line and the second column line during the first frame period are defined as A0 and A2, and raw data output through each of the first column line and the second column line during the second frame period are defined as A1 and A3, a distance (d) between the pixel and the subject may be determined as follows. In the following Equation 1, c refers to a speed of light, and fm refers to a frequency of a light control signal input to a light source.

$$\varphi = \arctan\left(\frac{A1 - A3}{A0 - A2}\right)$$ [Equation 1]

$$d = \frac{c}{2f_m} \frac{\varphi}{2\pi}$$

Equation 1 is given as an example, other functions of the waveforms of FIGS. 8A and 8B may be used to estimate the depth d.

Figure 9A:
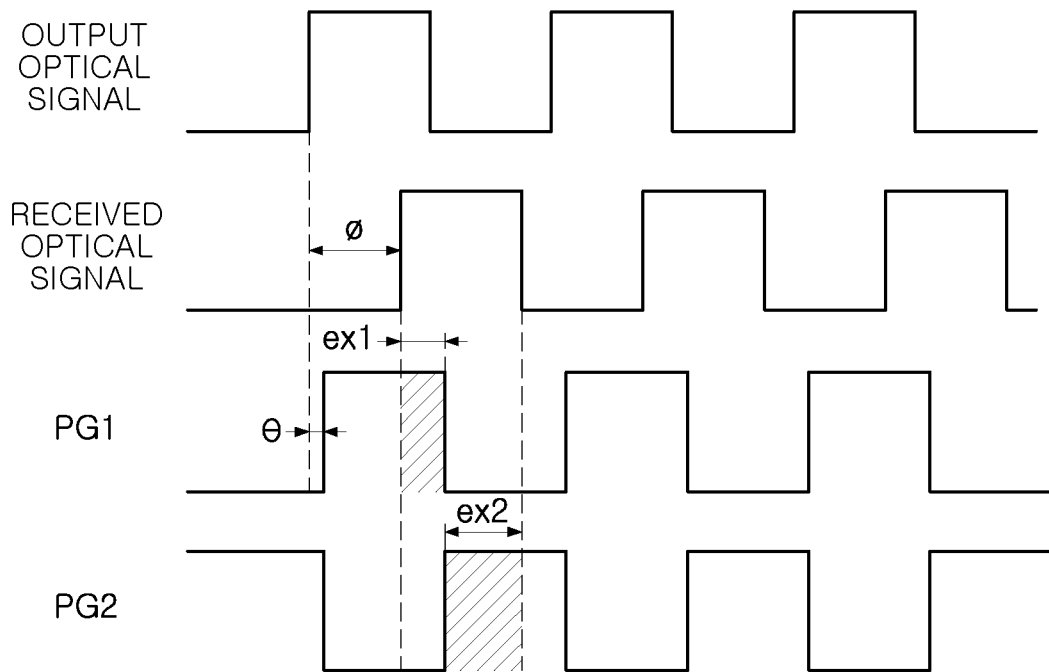
Figure 9B:
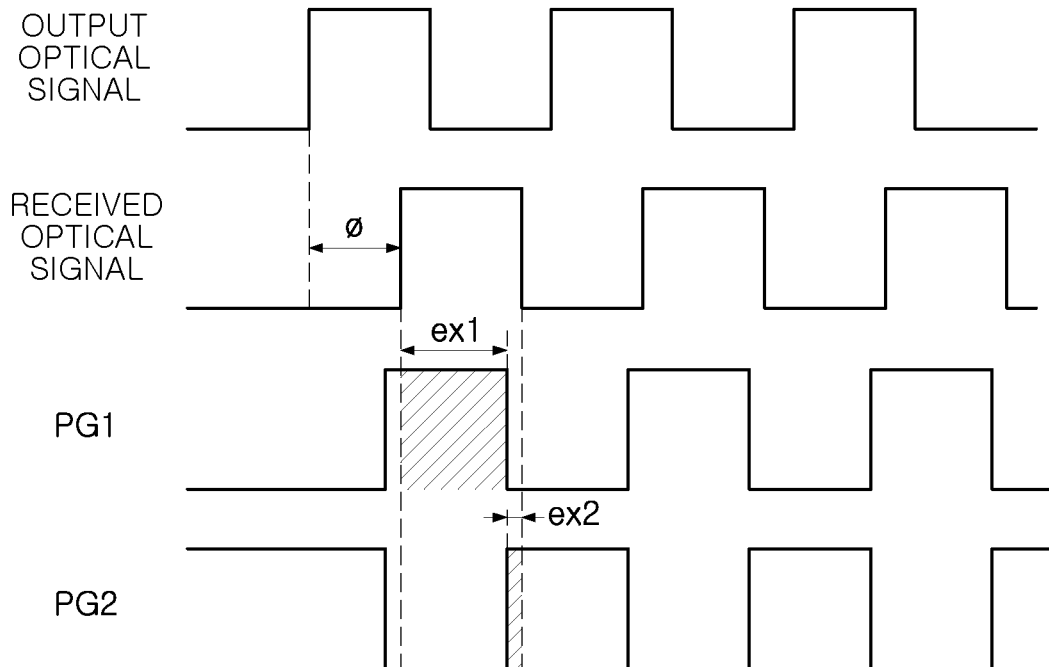

FIGS. 9A and 9B illustrate an output optical signal, a received optical signal, a first photo-control signal PG1, and a second photo-control signal PG2 during a first frame period and a second frame period. In an embodiment illustrated in FIGS. 9A and 9B, unlike the embodiment illustrated in FIGS. 8A and 8B, a phase difference error (θ) may occur between the output optical signal, and the first photo-control signal PG1 and the second photo-control signal PG2. For example, referring to FIG. 9A, due to the phase difference error (θ), a phase difference between the first photo-control signal PG1 and the output optical signal may be greater than 0 degree, and a phase difference between the second photo-control signal PG2 and the output optical signal may be greater than 180 degrees. Therefore, a first exposure time (ex1) and a second exposure time (ex2) appearing in the first frame period and the second frame period may also be different from those of a case in which there is no phase difference error (θ).

Since the first exposure time (ex1) and the second exposure time (ex2) appearing in the first frame period and the second frame period may be different due to the phase difference error (θ), a distance between the pixel and the subject may not be accurately measured. In an embodiment of the present application, by arranging phase difference detection pixels for detecting the phase difference error (θ) in the pixel array, the phase difference error (θ) may be detected, and compensation data for compensating the phase difference error (θ) may be generated. Alternatively, the phase difference error (θ) may be detected by shifting the first photo-control signal PG1 and the second photo-control signal PG2 input to the pixels in each of the two frame periods, without the phase difference detection pixels.

Figure 10A:
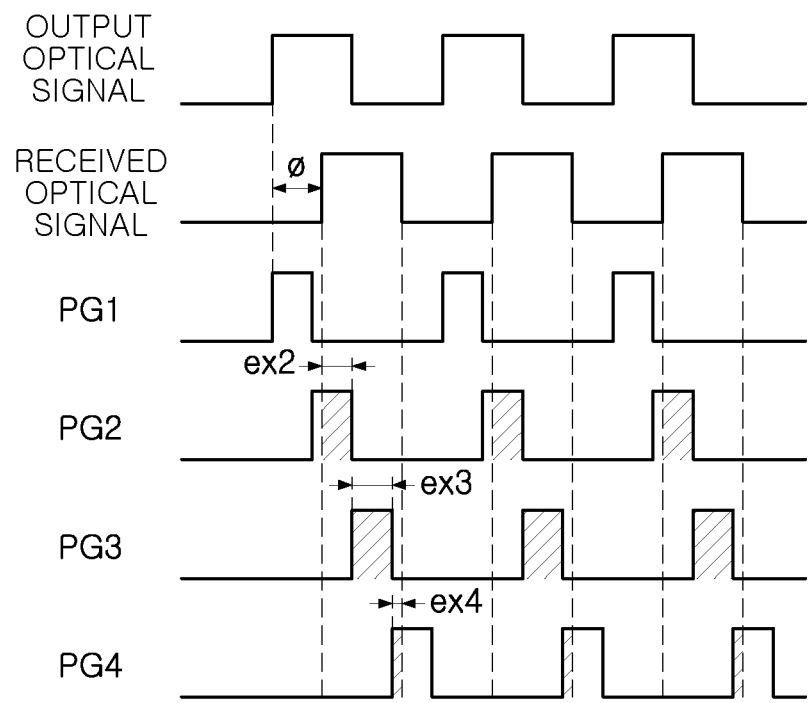
Figure 10B:
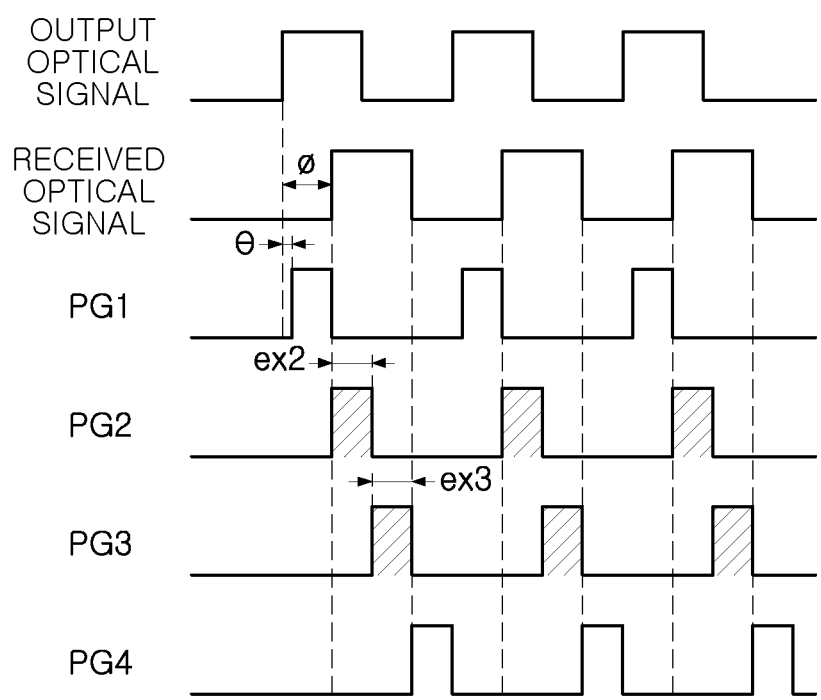

Next, FIGS. 10A and 10B may be timing diagrams with or without a phase difference error (θ) in an image sensor in which one pixel includes four pixel circuits. FIG. 10A may be a timing diagram corresponding to a case in which a phase difference error (θ) does not exist, and FIG. 10B may be a timing diagram corresponding to a case in which a phase difference error (θ) exists.

Referring to FIGS. 10A and 10B, one pixel in an image sensor may include four pixel circuits. First to fourth phototransistors included in the four pixel circuits may receive first to fourth photo-control signals PG1 to PG4. Each of the first to fourth photo-control signals PG1 to PG4 may have a predetermined phase difference from an output optical signal, and may have a duty ratio lower than that of the output optical signal. The first photo-control signal PG1 may have a phase difference of 0 degree from the output optical signal, and each of the second to fourth photo-control signals PG2 to PG4 may have phase differences of 90 degrees, 180 degrees, and 270 degrees. For example, duty ratios of the first to fourth photo-control signals PG1 to PG4 may be ½ of duty ratios of output optical signals.

Referring to FIG. 10A, a turn on time of a first photo-control signal PG1 may not overlap a time at which a received optical signal enters a photodiode. The turn on time of each of the second to fourth photo-control signals PG2 to PG4 may overlap a time at which a received optical signal enters a photodiode, in amounts of the second to fourth exposure times (ex2 to ex4), respectively. The image sensor may measure a distance from the pixel to a subject by the method described above with reference to the above Equation 1. Therefore, the distance between the pixel and the subject may be measured with data acquired during a single frame period.

In an embodiment illustrated FIG. 10B, a phase difference error (θ) may exist. Therefore, whether or not a turn on time of first to fourth photo-control signals PG1 to PG4 and a received optical signal overlap each other may be different from the embodiment illustrated in FIG. 10A. For example, in an embodiment illustrated in FIG. 10B, due to the phase difference error (θ), only turn on times of a second photo-control signal PG2 and a third photo-control signal PG3 may overlap a time at which a received optical signal enters a photodiode. Due to the phase difference error (θ), a distance between a pixel detected by an image sensor and a subject may be different, and an error may occur in a depth map. As described above, in an embodiments of the present application, the phase difference error (θ) may be detected by using phase difference detection pixels for detecting the phase difference error (θ), or by shifting the photo-control signals PG1 to PG4 in each of the two frame periods, and inputting the same into the pixels.

Figure 11:
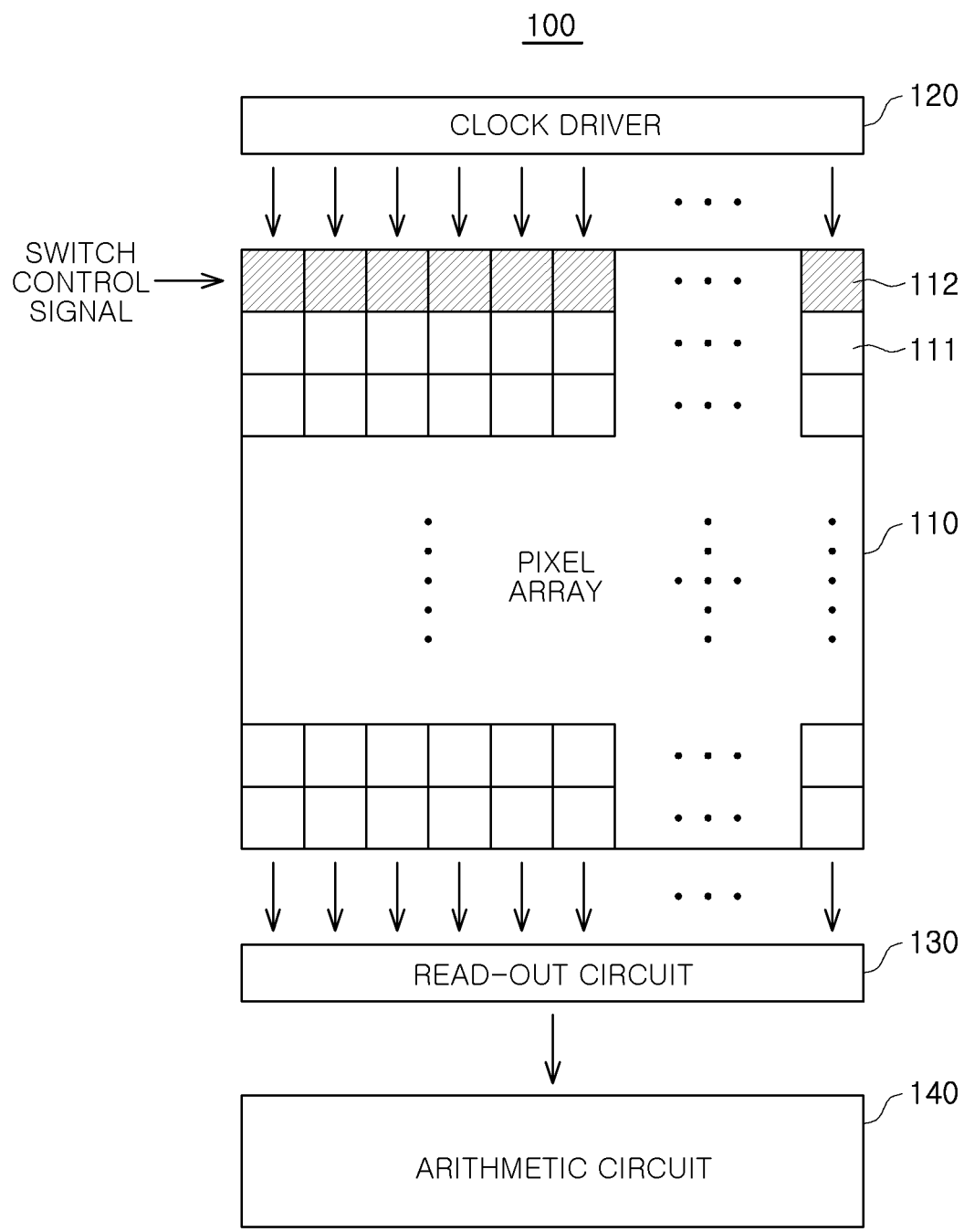
FIG. 11 is a view schematically illustrating an image sensor according to an embodiment of the present application.
Figure 12:
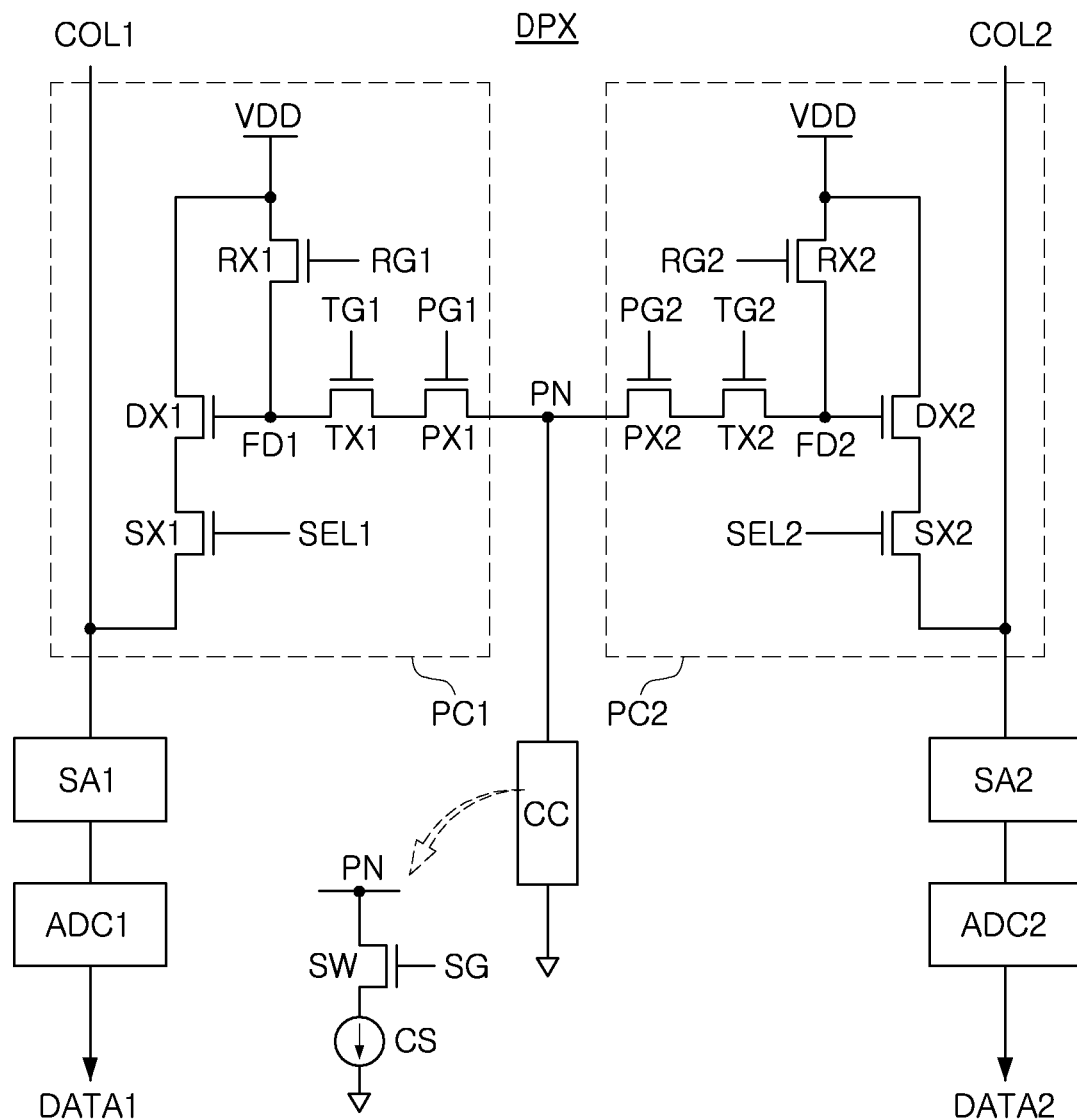
FIGS. 12 and 13 are circuit diagrams illustrating phase difference detection pixels included in an image sensor according to an embodiment of the present application.
Figure 13:
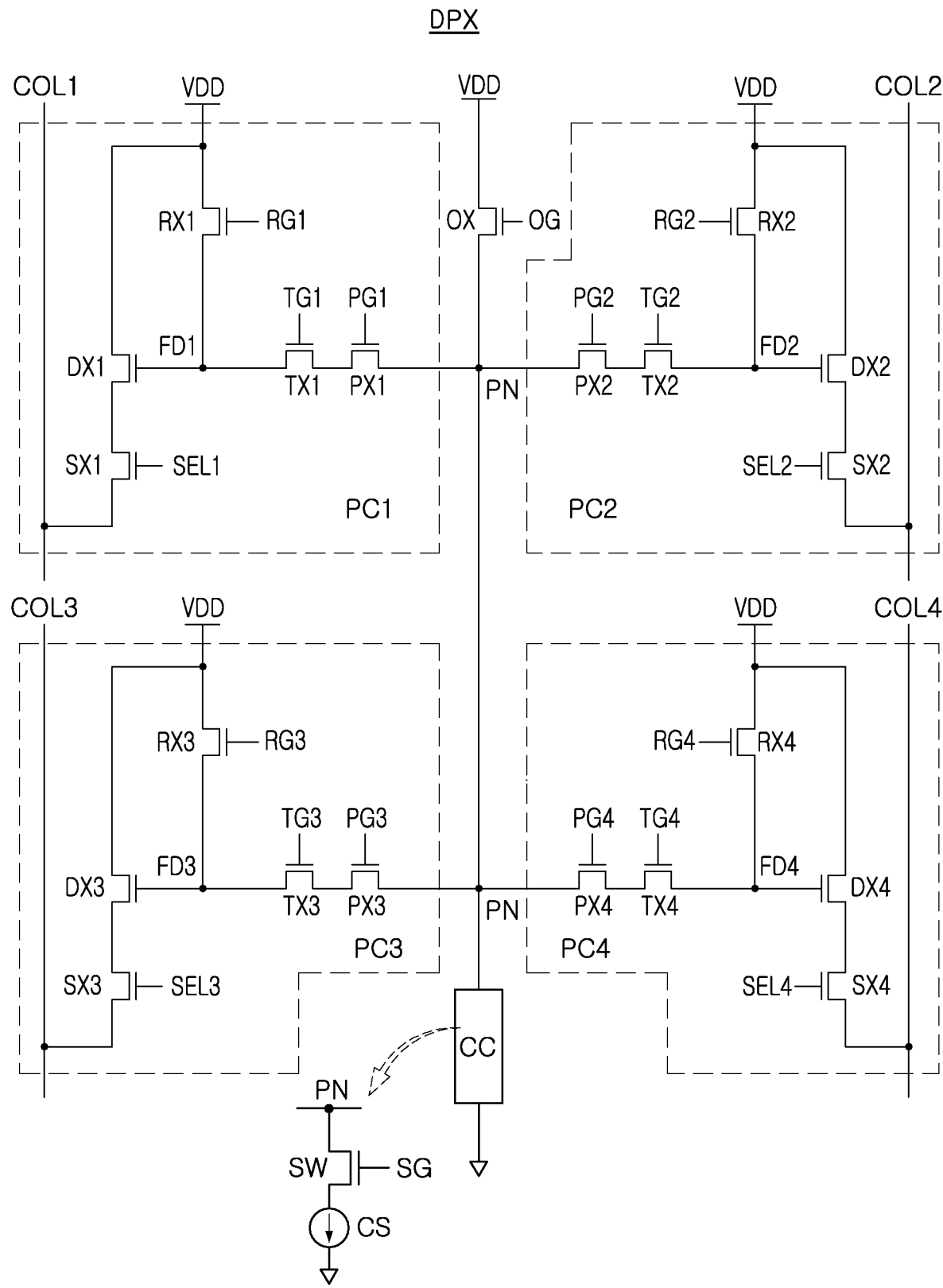

FIG. 11 is a view schematically illustrating an image sensor according to an embodiment of the present application. FIGS. 12 and 13 are circuit diagrams illustrating phase difference detection pixels included in an image sensor according to an embodiment of the present application.

Referring to FIG. 11, an image sensor 100 according to an embodiment of the present application may include a pixel array 110, a clock driver 120, a read-out circuit 130, an arithmetic circuit 140, and the like. The pixel array 110 may include a plurality of pixels 111 and 112 arranged in a row direction and a column direction. In an example, the pixel array 110 may include a plurality of general pixels 111 and a plurality of phase difference detection pixels 112. The general pixels 111 may be arranged in an array form in the row direction and the column direction, and the phase difference detection pixels 112 may be arranged in the row direction. The number and arrangement of the phase difference detection pixels 112 may be variously changed according to embodiments.

For example, the clock driver 120 may be connected to the plurality of pixels through a plurality of photo-control lines. The plurality of photo-control lines may be lines for inputting photo-control signals to each of the pixels. The read-out circuit 130 may be connected to the pixels through a plurality of column lines connected to selection transistors of the pixels.

In an embodiment, the phase difference detection pixels 112 may have a structure, different from the general pixels 111. Hereinafter, the phase difference detection pixels 112 will be described with reference to FIGS. 12 and 13.

Referring first to FIG. 12, a phase difference detection pixel DPX included in an image sensor according to an embodiment of the present application may include a first pixel circuit PC1, a second pixel circuit PC2, an electric charge circuit CC, and the like. The first pixel circuit PC1, the second pixel circuit PC2, and the electric charge circuit CC may be connected to a pixel node PN. The first pixel circuit PC1 and the second pixel circuit PC2 may be similar to those described above with reference to FIG. 5. For example, a pixel circuit included in the phase difference detection pixel DPX may have the same structure as a pixel circuit included in a general pixel. For example, a first phototransistor PX1 may receive a first photo-control signal PG1 through a first photo-control line connected to a clock driver, a second phototransistor PX2 may receive a second photo-control signal PG2 through a second photo-control line connected to a clock driver.

In some embodiments, the electric charge-supplying source, CC, includes a current mirror. An example of a current mirror includes two transistors configured with a first gate of the first transistor connected to a second gate of the second transistor, and a reference current is configured to flow through the first transistor.

In the phase difference detection pixel DPX, the electric charge circuit CC may be connected to the pixel node PN, instead of a photodiode. The electric charge circuit CC may output an electric charge to the pixel node PN. In an example, the electric charge circuit CC may include an electric charge-supplying source CS for outputting an electric charge, and a switch element SW connected between the electric charge-supplying source CS and the pixel node PN. The switch element SW may be turned on/off by a switch control signal SG.

Referring to FIG. 13, a phase difference detection pixel DPX included in an image sensor according to an embodiment of the present application may include first to fourth pixel circuits PC1 to PC4, an electric charge circuit CC, and the like. The first to fourth pixel circuits PC1 to PC4 and the electric charge circuit CC may be connected to a pixel node PN. The first to fourth pixel circuits PC1 to PC4 may be similar to those described above with reference to FIG. 6. The pixel circuits of the phase difference detection pixel DPX may have the same structure as pixel circuits of a general pixel including a photodiode.

The electric charge circuit CC may supply an electric charge to the pixel node PN as described above with reference to FIG. 12. The electric charge circuit CC may include a switch element SW and an electric charge-supplying source CS, connected in series, and the switch element SW may be turned on and off by a switch control signal SG to supply an electric charge output from the electric charge-supplying source CS to the pixel node PN.

In embodiments illustrated in FIGS. 12 and 13, a switch control signal SG input to a switch element SW may be the same signal as a light control signal input to a light source of an imaging device. Hereinafter, an operation of a phase difference detection pixel DPX will be described in more detail with reference to FIGS. 14A and 14B.

Figure 14A:
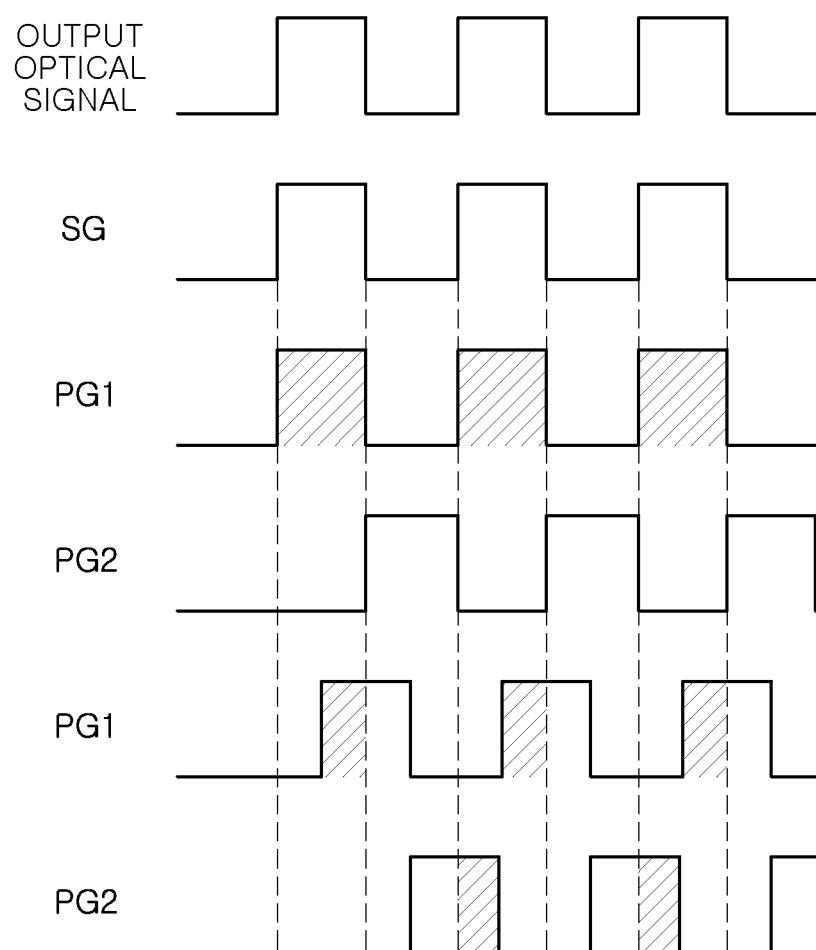
FIGS. 14A and 14B are timing diagrams illustrating an operation of phase difference detection pixels included in an image sensor according to an embodiment of the present application.
Figure 14B:
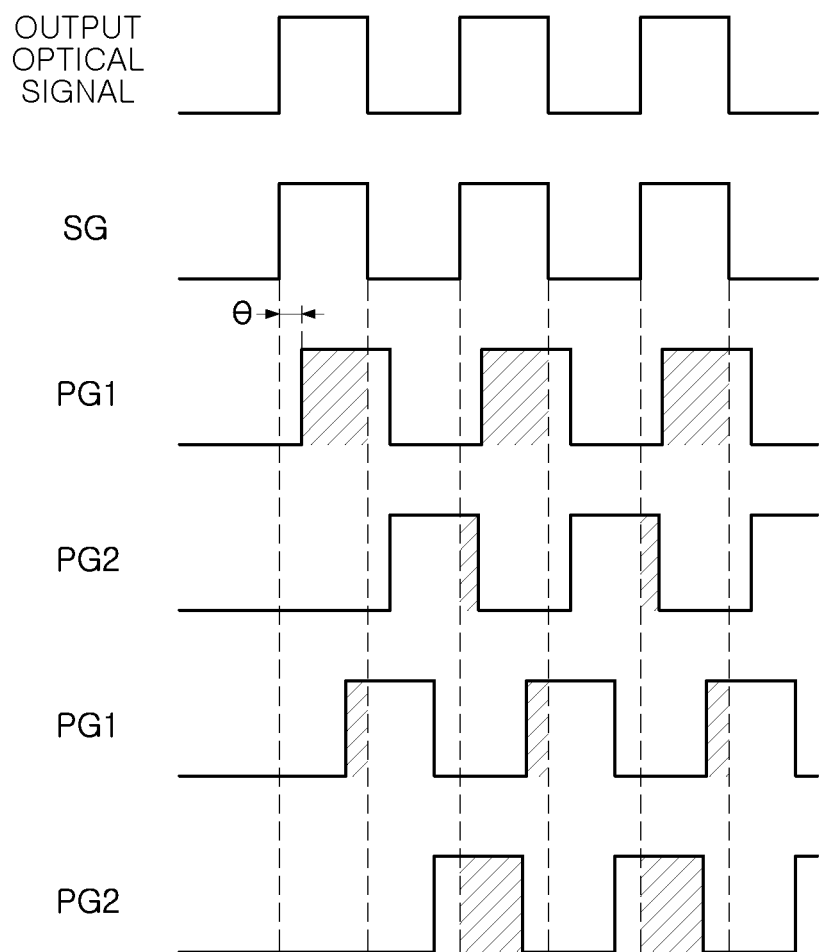

FIGS. 14A and 14B are timing diagrams illustrating an operation of phase difference detection pixels included in an image sensor according to an embodiment of the present application.

In embodiments illustrated in FIGS. 14A and 14B, an output optical signal may be an optical signal output from a light source that operates in a PWM manner, and may have the same period and duty ratio as a light control signal input to the light source. A switch control signal SG may be the same signal as the light control signal. Therefore, the output optical signal and the switch control signal SG may have the same period and duty ratio, and a phase difference between the output optical signal and the switch control signal SG may be 0 degree.

An embodiment described with respect to FIG. 14A may be an ideal case in which an unintended phase difference error between a light control signal input to a light source of an imaging device, and a first photo-control signal PG1 and a second photo-control signal PG2 may not occur. Referring to FIG. 14A, during a first frame period, the first photo-control signal PG1 may be a signal having a phase difference of 0 degree from the light control signal, and the second photo-control signal PG2 may be a signal having a phase difference of 180 degrees from the light control signal. Therefore, in an ideal case, an electric charge output from an electric charge-supplying source CS during the first frame period may all be stored in a first phototransistor PX1.

During a second frame period following the first frame period, the first photo-control signal PG1 may have a phase difference of 90 degrees from the light control signal, and the second photo-control signal PG2 may have a phase difference of 270 degrees from the light control signal. Therefore, in an ideal case, during the second frame period, the electric charges output from the electric charge-supplying source CS may be divided by ½ and be stored in the first phototransistor PX1 and a second phototransistor PX2.

An embodiment described with reference to FIG. 14B may be an example in which an unintended phase difference error (θ) between a light control signal input to a light source of an imaging device, and a first photo-control signal PG1 and a second photo-control signal PG2 may occur. Referring to FIG. 14B, during a first frame period, a phase difference error (θ) may occur between the first photo-control signal PG1 and the light control signal. Due to the phase difference error (θ), a phase difference between the second photo-control signal PG2 and the light control signal may be 180 degrees+θ. Therefore, electric charges output from an electric charge-supplying source CS during the first frame period may be divided and stored in a first phototransistor PX1 and a second phototransistor PX2.

In a second frame period following the first frame period, the first photo-control signal PG1 may have a phase difference of 90 degrees+θ from the light control signal, and the second photo-control signal PG2 may have a phase difference of 270 degrees+θ from the light control signal. Therefore, in the embodiment illustrated in FIG. 14B, the electric charge output from the electric charge-supplying source CS during the second frame period may be stored more in the second phototransistor PX2 than in the first phototransistor PX1.

As a result, when a case in which the phase difference error (θ) occurs is compared with a case in which the phase difference error (θ) does not occur, a difference may occur between data output from a phase difference detection pixel DPX. An imaging device and an image sensor according to an embodiment of the present application may detect whether or not the phase difference error (θ), a magnitude thereof, and the like, by inputting a light control signal as a switch control signal SG to a switch element SW of a phase difference detection pixel DPX, and using data acquired from the phase difference detection pixel DPX. When the phase difference error (θ) is detected, a clock driver may reflect a compensation value, capable of offsetting the phase difference error (θ), to a first photo-control signal PG1 and a second photo-control signal PG2, input to a general pixel PX. Therefore, the phase difference error (θ) may be eliminated; and performance of the imaging device and the image sensor may be improved.

For example, in FIG. 14B, data used for phase difference error correction includes first data corresponding to a first waveform area such as the hashed area of the waveform PG1 during the first frame, second data corresponding to a second waveform area such as the hashed area of the waveform PG2 during the first frame, third data corresponding to a third waveform area such as the hashed area of the waveform PG1 during the second frame, and fourth data corresponding to a fourth waveform area such as the hashed area of the waveform PG2 during the second frame. In some embodiments, a controller obtains the first data from the first pixel circuit such as PC3 after a first frame time, obtains the second data from the second pixel circuit such as PC4 after the first frame time, obtains the third data from the first pixel circuit PC3 after a second frame time, and obtains the fourth data from the second pixel circuit PC4 after the second frame time. The controller then estimates a phase error θ (see FIG. 14B) as proportional to at least one of: i) the fourth data minus the third data and ii) the second data plus a predetermined constant minus the first data. The controller then adjusts the phase of at least one of the first photo-control signal PG1 (in PC1 of FIG. 6) and the second photo-control signal PG2 (in PC2 of FIG. 6) based on the estimated phase error; the estimated θ. Thus information from DPX of FIG. 12 is used to improve the clocking of circuits in PX of FIG. 6. This leads to less error in estimating depth, d, using an arrangement such as pixel array 30 in FIG. 3.

Figure 15A:
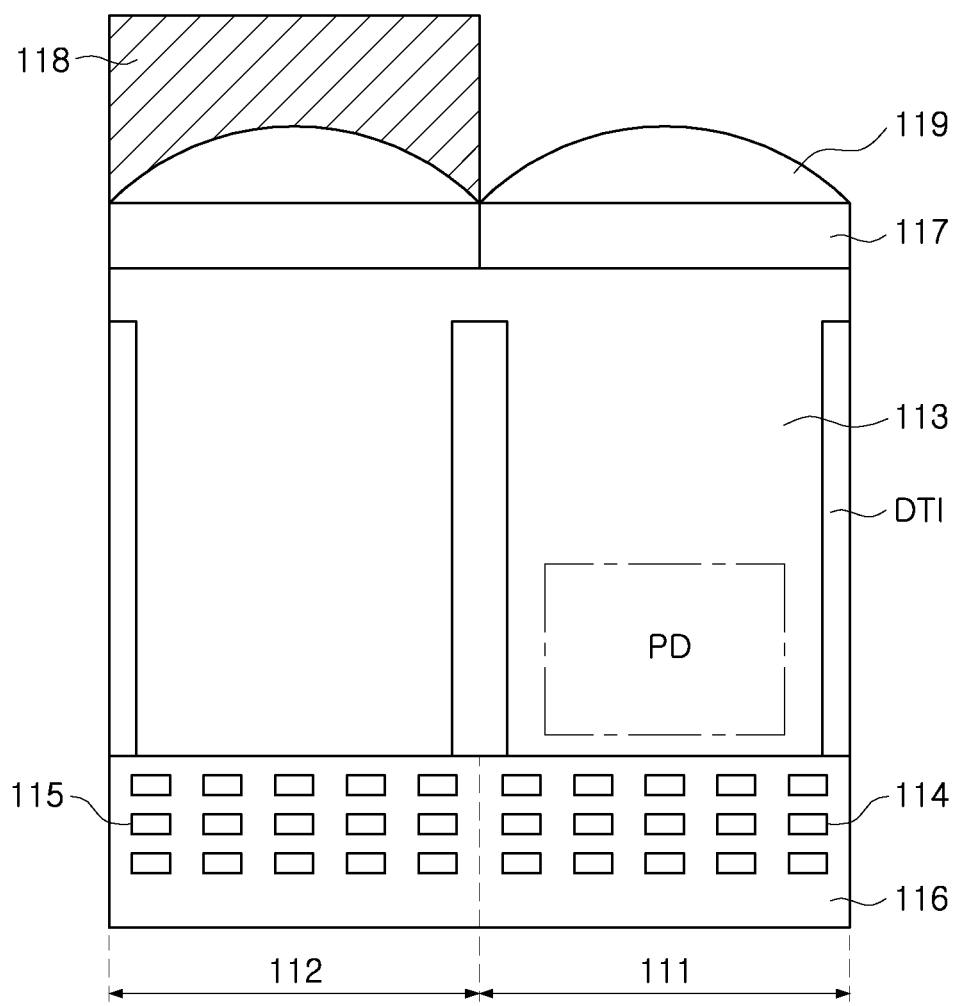
FIGS. 15A and 15B are views schematically illustrating pixels of an image sensor according to an embodiment of the present application.
Figure 15B:
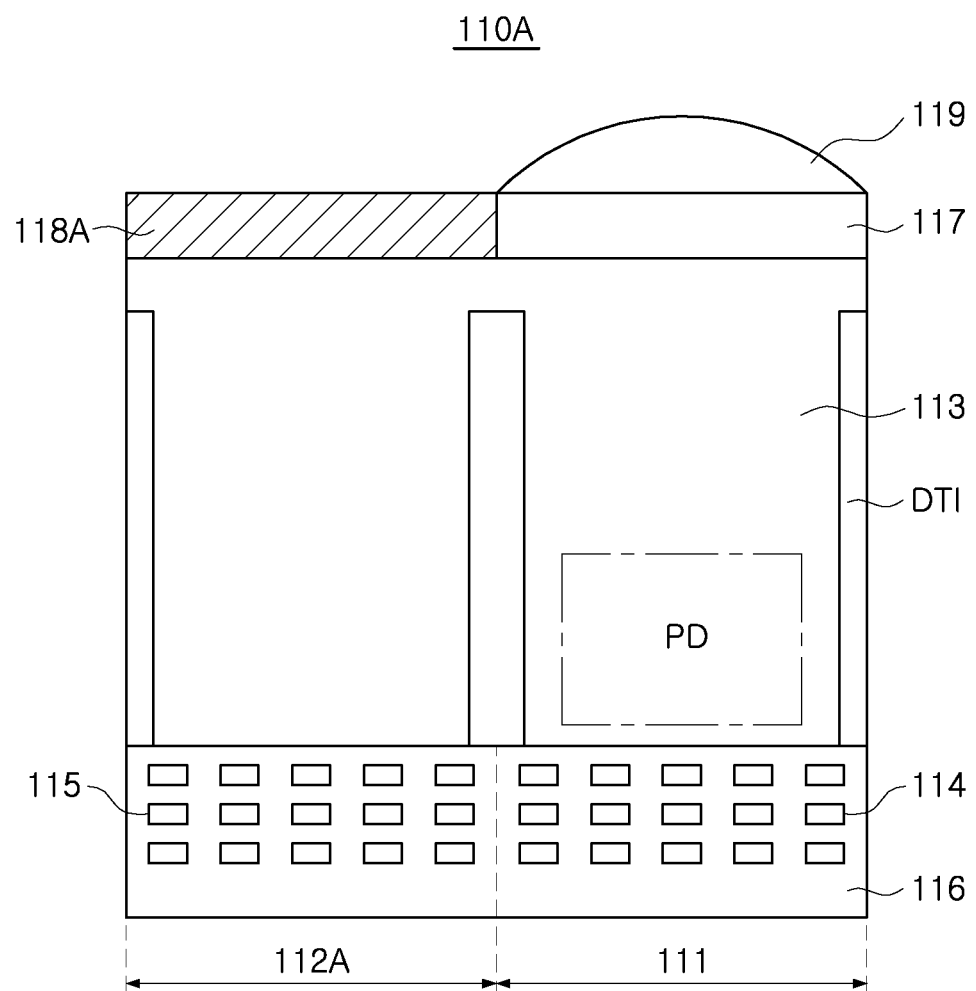

FIGS. 15A and 15B are views schematically illustrating pixels of an image sensor according to an embodiment of the present application. For example, FIGS. 15A and 15B may be views illustrating a portion of the pixel array 110 of the image sensor 100 illustrated in FIG. 11.

In an embodiment illustrated in FIG. 15A, a pixel array 110 may include a general pixel 111 and a phase difference detection pixel 112. The general pixel 111 and the phase difference detection pixel 112 may be formed in a semiconductor substrate 113, and may be separated from each other by a pixel separation layer DTI. The general pixel 111 and the phase difference detection pixel 112 may commonly include a circuit insulation layer 116, an optical insulation layer 117, a micro-lens 119, and the like.

An embodiment illustrated in FIG. 15A is illustrated that only the general pixel 111, not the phase difference detection pixel 112, includes a photodiode PD. Alternatively, the phase difference detection pixel 112 may include a photodiode PD. The phase difference detection pixel 112 may include a light blocking layer 118 formed of an opaque material that does not transmit light, and the light blocking layer 118 may block an optical signal incident on the phase difference detection pixel 112.

Next, referring to FIG. 15B, a micro-lens 119 and an optical insulation layer 117 may not be formed in a phase difference detection pixel 112A of a pixel array 110A. In a manufacturing process of the pixel array 110A, after a photodiode PD and a pixel separation layer DTI may be formed in the semiconductor substrate 113, and pixel circuits 114 and 115 may be formed, a light blocking layer 118A may be formed only in an area corresponding to the phase difference detection pixel 112A. The optical insulation layer 117 and the micro-lenses 119 may be formed in an area corresponding to a general pixel 111. According to embodiments, a photodiode PD may be formed in the phase difference detection pixel 112A.

FIGS. 16 to 19 are views schematically illustrating an image sensor according to an embodiment of the present application.

Figure 16:
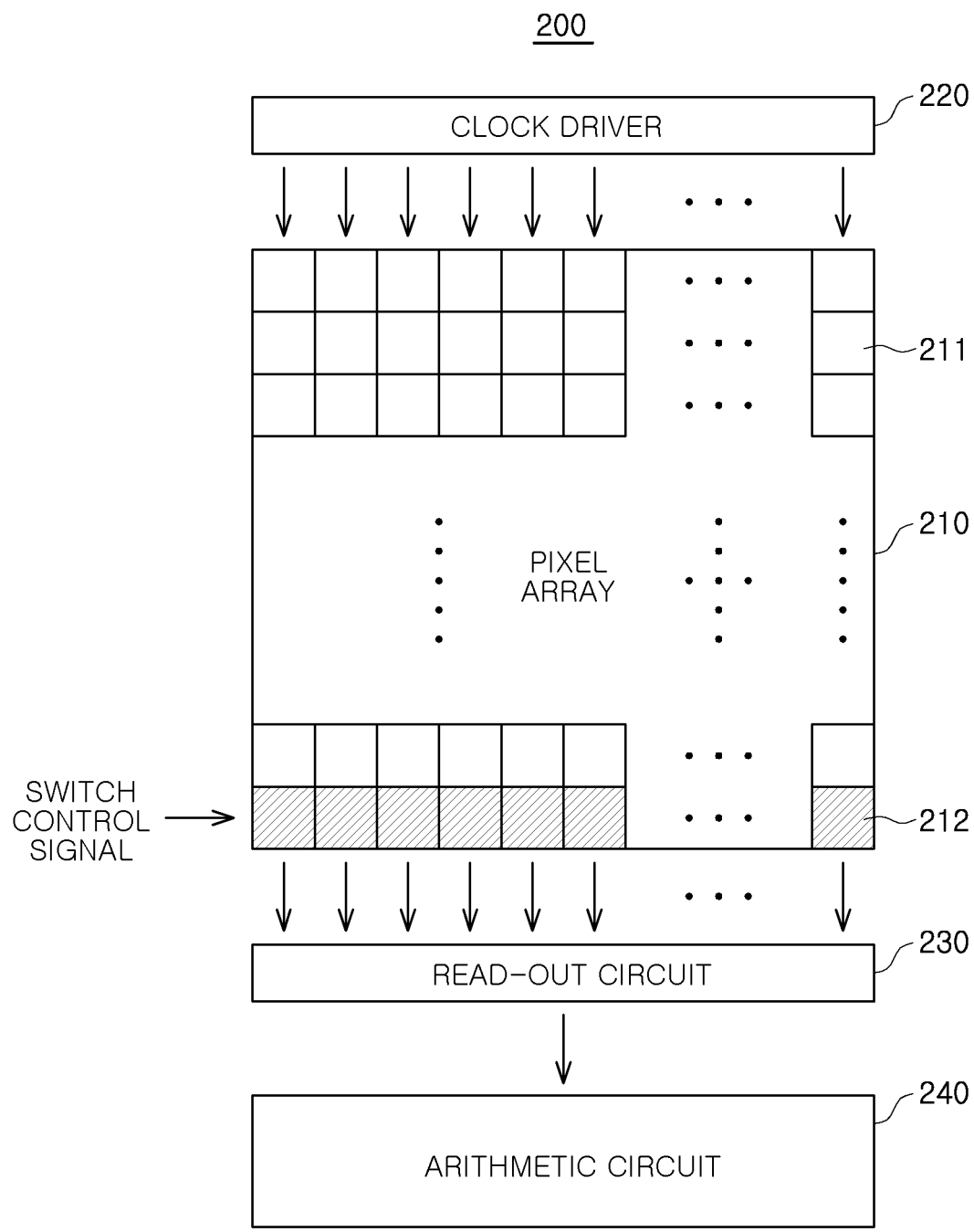
FIGS. 16 to 19 are views schematically illustrating an image sensor according to an embodiment of the present application.

Referring first to FIG. 16, an image sensor 200 according to an embodiment of the present application may include a pixel array 210, a clock driver 220, a read-out circuit 230, an arithmetic circuit 240, and the like. The pixel array 210 may include a plurality of pixels 211 and 212 arranged in a row direction and a column direction. In an example, the pixel array 210 may include a plurality of general pixels 211 and a plurality of phase difference detection pixels 212. The general pixels 211 may be arranged in an array form in the row direction and the column direction, and the phase difference detection pixels 212 may be arranged in the row direction. In an embodiment illustrated in FIG. 16, the phase difference detection pixels 212 may be disposed along a lowermost row line in the pixel array 210.

Operations of the clock driver 220, the read-out circuit 230, and the arithmetic circuit 240 may be similar to those described above with reference to FIG. 11. In an example, the clock driver 220 may input photo-control signals to each of the pixels 211 and 212 through photo-control lines in the column direction. For example, the pixels 211 and 212 arranged in the column direction, in the same position in the row direction, may be connected to the same photo-control line, and may receive the same photo-control signal during an exposure time of a global shutter operation.

Figure 17:
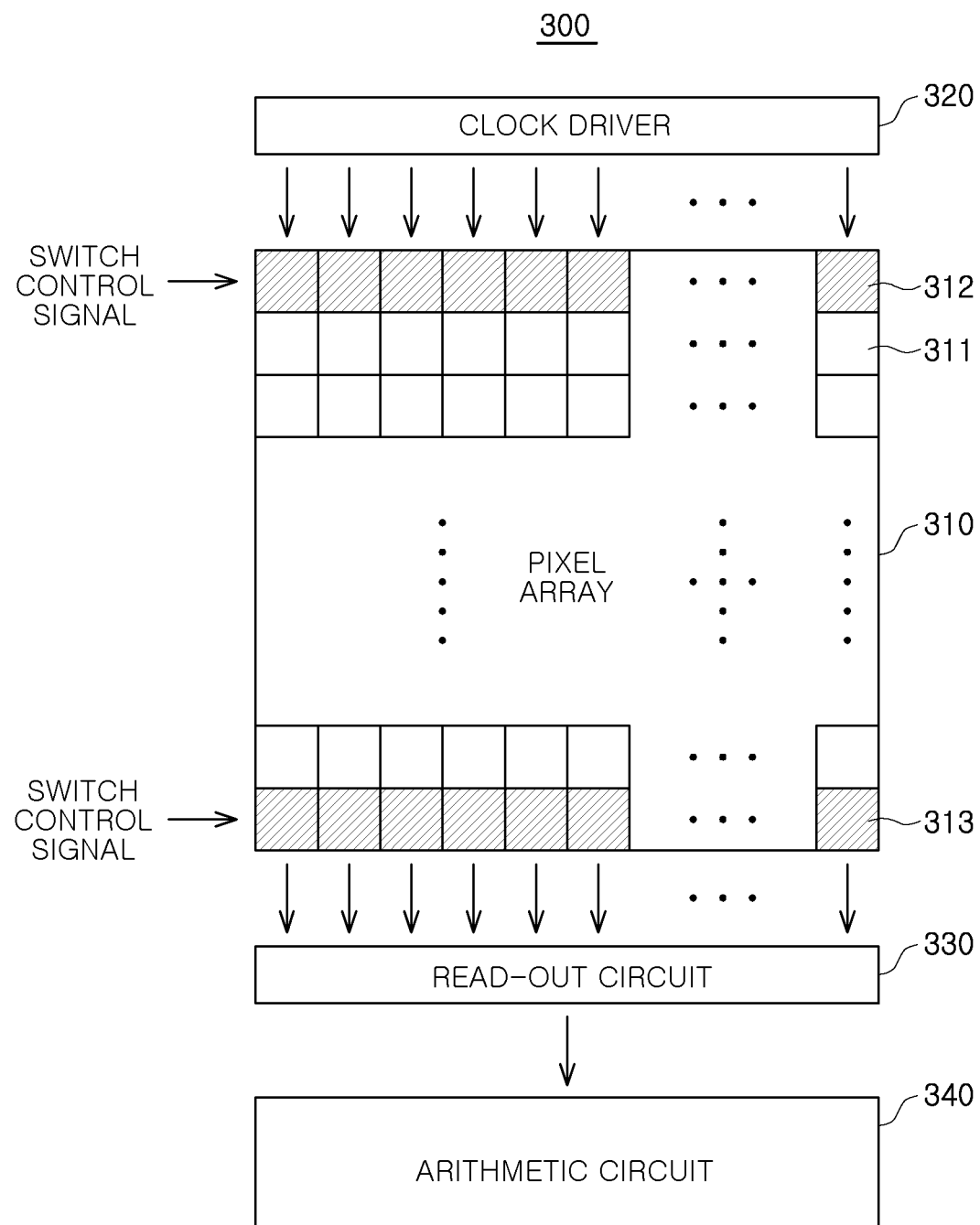

Referring to FIG. 17, in a pixel array 310 of an image sensor 300, phase difference detection pixels 312 and 313 may be arranged along an uppermost row line and a lowermost row line. General pixels 311 may be disposed between the phase difference detection pixels 312 and 313 in a column direction. Operations of a clock driver 320, a read-out circuit 330, and an arithmetic circuit 340 may be similar to those described above.

Figure 18:
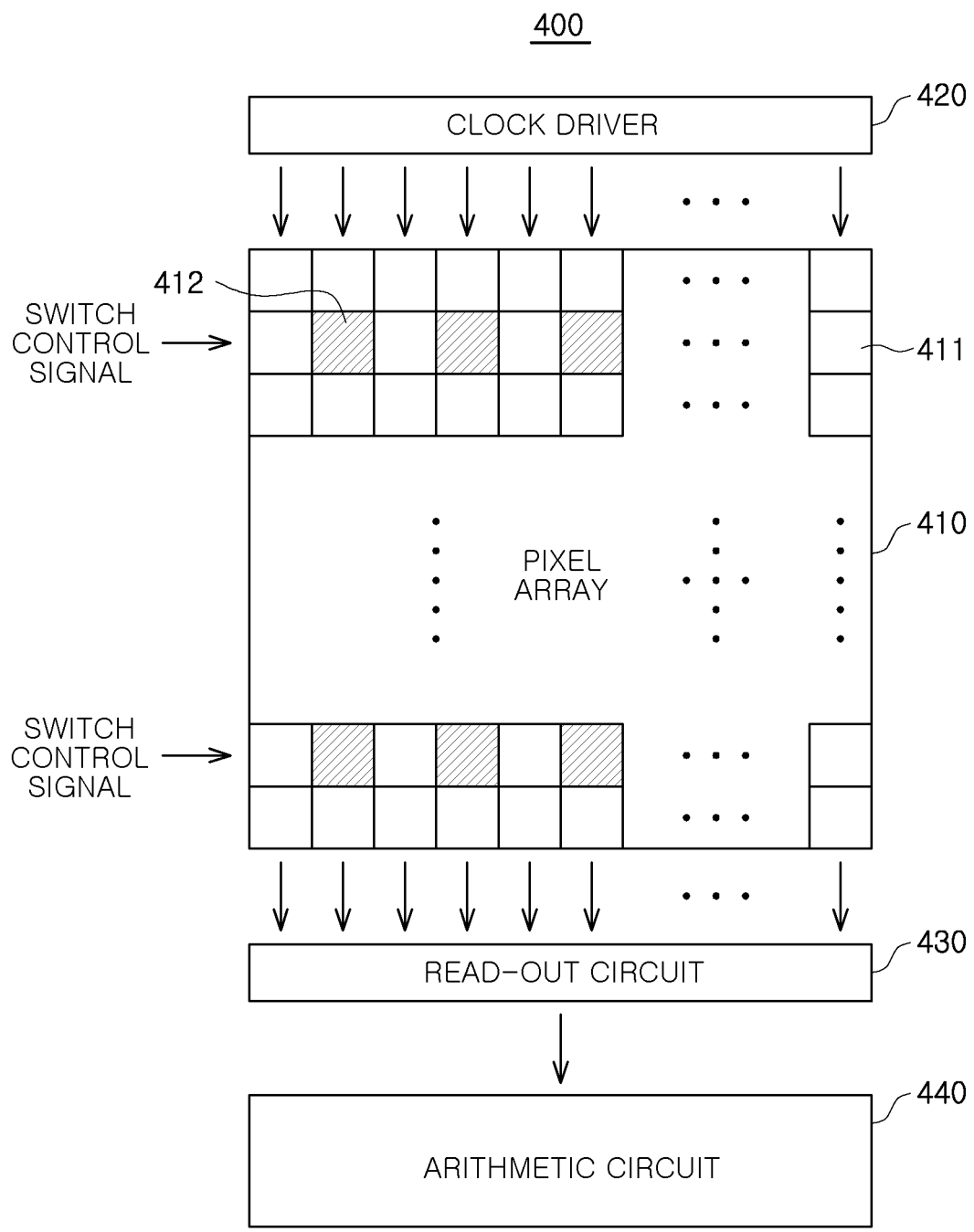

Referring to FIG. 18, in a pixel array 410 of an image sensor 400, phase difference detection pixels 412 may be surrounded by general pixels 411, and may be disposed separately from each other. Operations of a clock driver 420, a read-out circuit 430, and an arithmetic circuit 440 may be similar to those described above.

In an embodiment illustrated in FIG. 18, a portion of photo-control lines may not be connected to the phase difference detection pixels 412. An interpolation method may be used to compensate for a phase difference error of the photo-control signal input to the photo-control lines, not connected to the phase difference detection pixels 412. In an embodiment illustrated in FIG. 18, from the phase difference detection pixels 412, phase difference errors of the photo-control signals input to even-numbered photo-control lines may be obtained, and the obtained phase difference errors may be used to estimate phase difference errors of the photo-control signals input to odd-numbered photo-control lines by an interpolation method.

Figure 19:
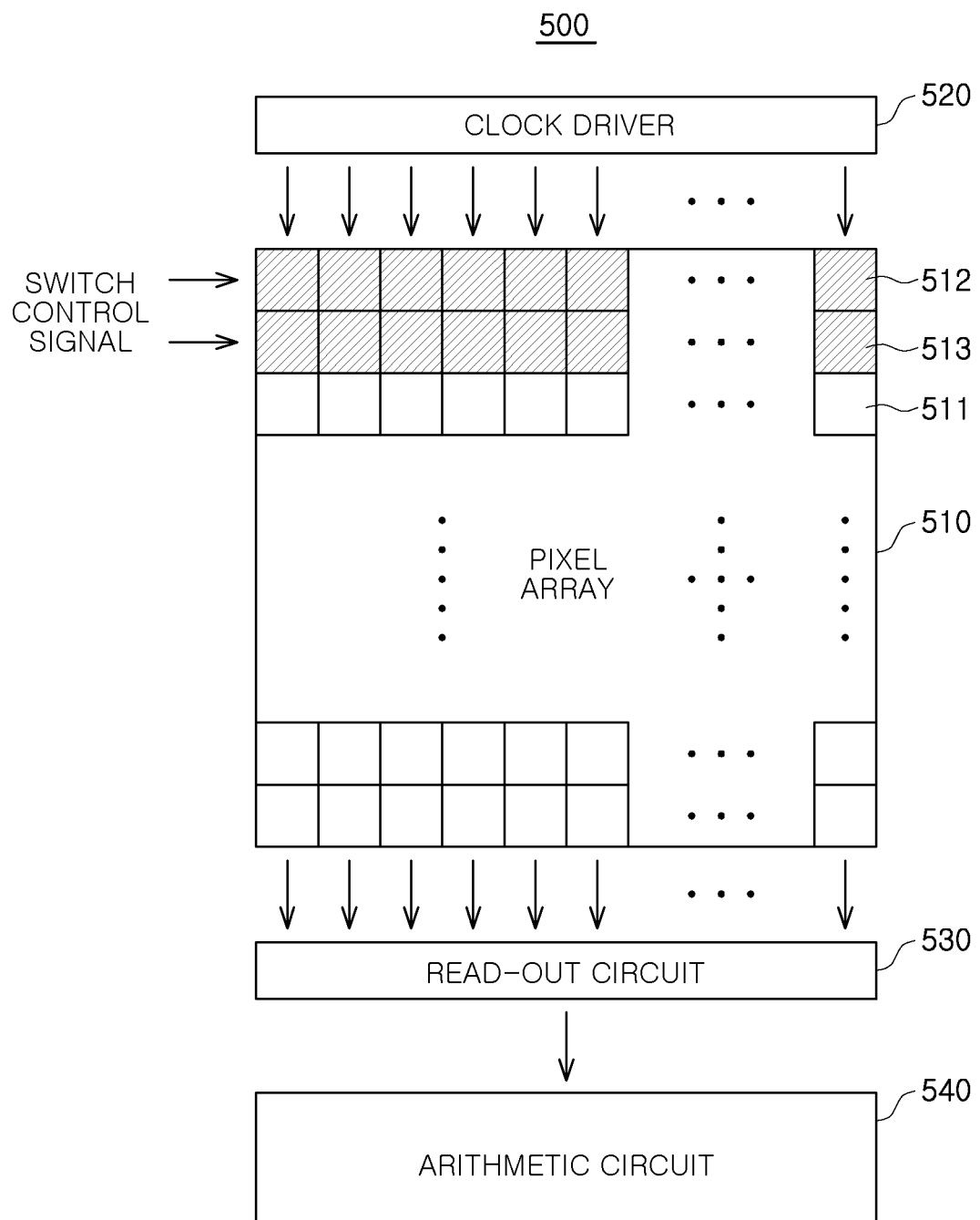

Next, referring to FIG. 19, in a pixel array 510 of an image sensor 500, phase difference detection pixels 512 and 513 may be arranged along two row lines located at an uppermost terminal. General pixels 511 may be disposed at a lower terminal of the phase difference detection pixels 512 and 513 in a column direction. Operations of a clock driver 520, a read-out circuit 530, and an arithmetic circuit 540 may be similar to those described above.

In an embodiment illustrated in FIG. 19, a switch control signal input to the phase difference detection pixels 512 and 513 may be a light control signal input to a light source constituting the image sensor 500 and an imaging device. According to embodiments, the switch control signal may be other than a light control signal. In an example, a switch control signal input to each of the phase difference detection pixels 512 and 513 may be one of photo-control signals input to the phase difference detection pixels 512 and 513.

In order to use one of the photo-control signals input to the phase difference detection pixels 512 and 513 as a switch control signal, a pair of phase difference detection pixels adjacent to each other in a row direction may be grouped into a single group. Hereinafter, a more detailed description will be given with reference to FIGS. 20 to 23.

Figure 20A:
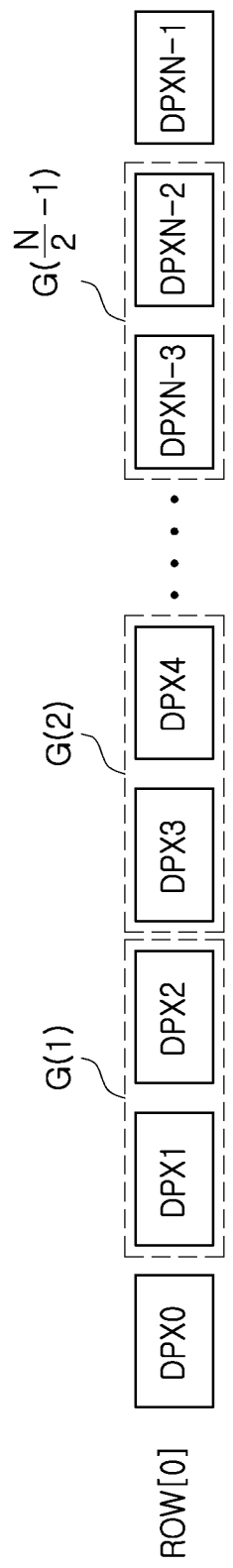
FIGS. 20A, 20B, and 21 are views illustrating a method of grouping phase difference detection pixels in an image sensor according to an embodiment of the present application.
Figure 20B:
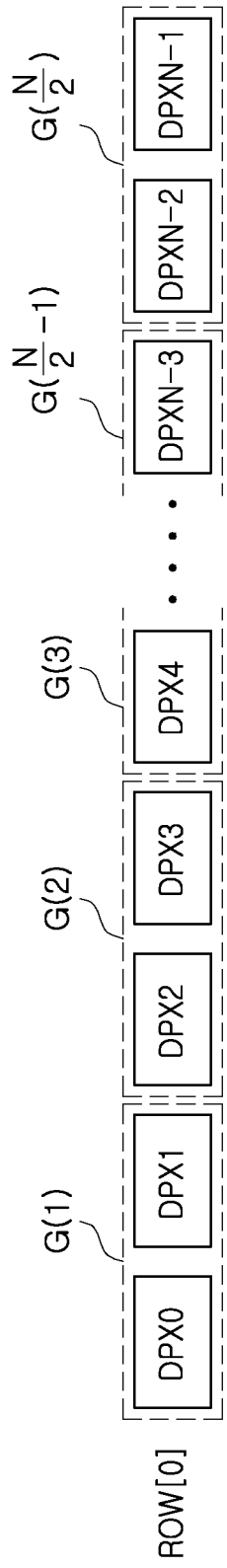
Figure 21:
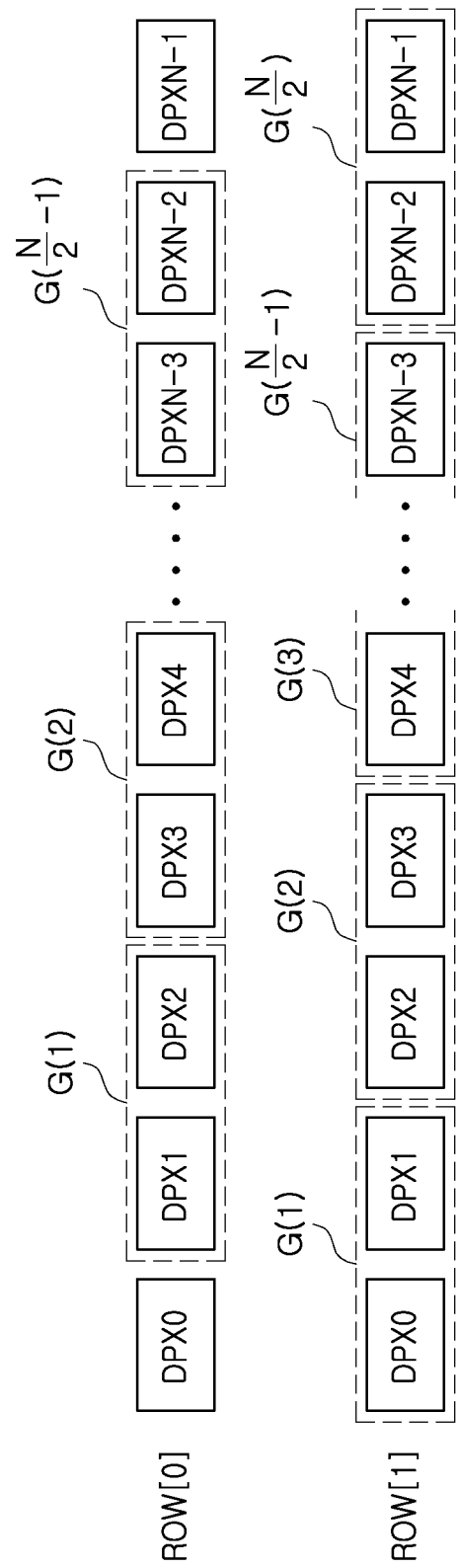
Figure 22:
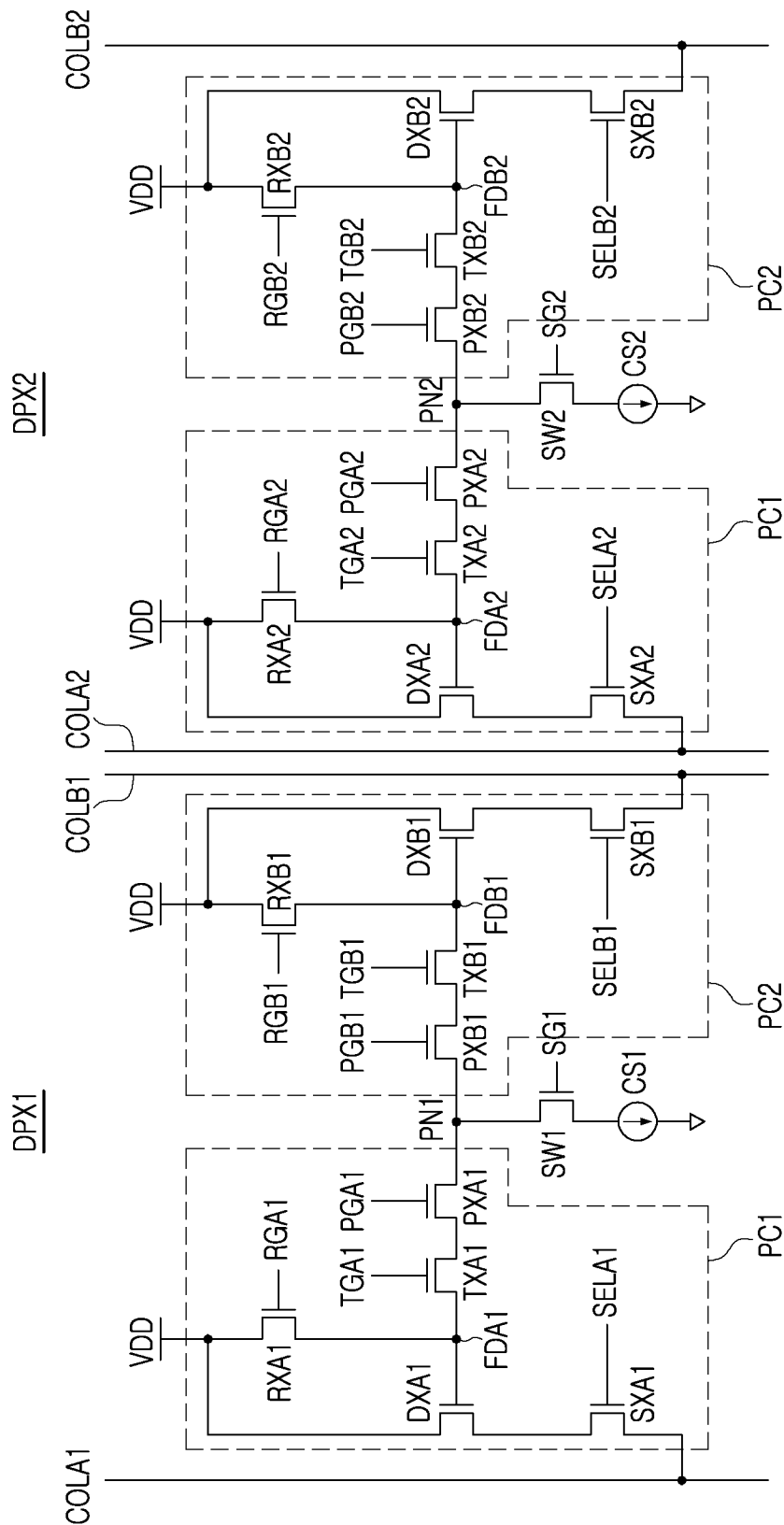
FIGS. 22 and 23 are views illustrating an operation of phase difference detection pixels included in one group in an image sensor according to an embodiment of the present application.
Figure 23:
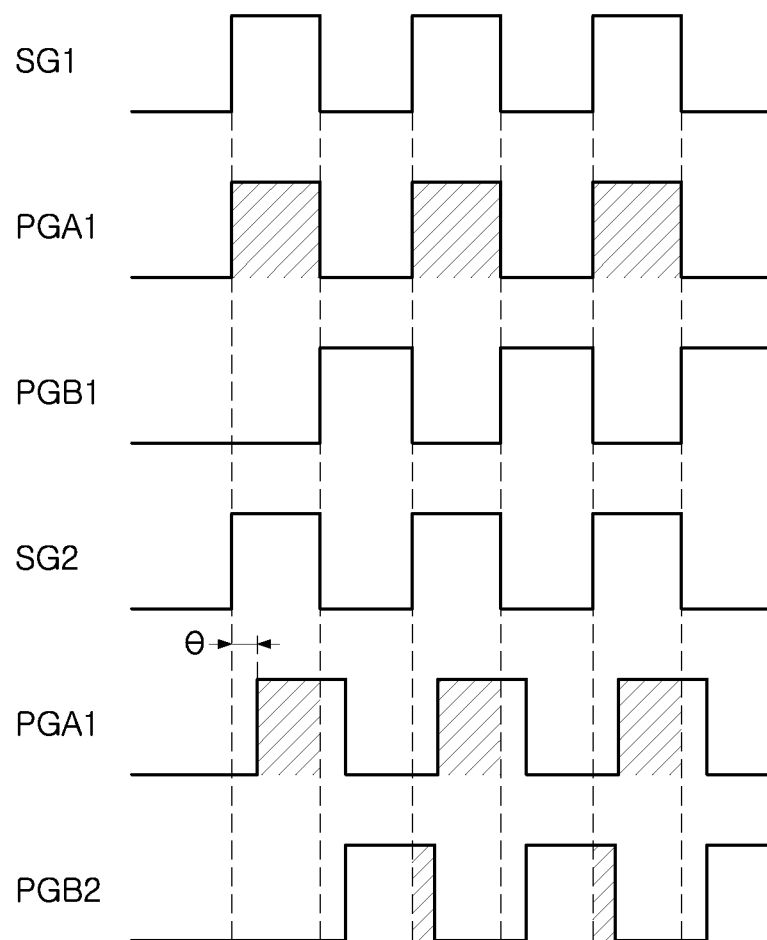

FIGS. 20 and 21 are views illustrating a method of grouping phase difference detection pixels in an image sensor according to an embodiment of the present application. FIGS. 22 and 23 are views illustrating an operation of phase difference detection pixels included in one group in an image sensor according to an embodiment of the present application.

FIGS. 20A and 20B are views for explaining a grouping method in an embodiment in which phase difference detection pixels are successively arranged along at least one row line in an image sensor. FIG. 20A may be a view corresponding to a grouping method during a first frame period, and FIG. 20B may be a view corresponding to a grouping method during a second frame period.

Referring first to FIG. 20A, remaining phase difference detection pixels, except for a first phase difference detection pixel DPX0 and the last phase difference detection pixel DPXN−1, may be grouped. A pair of phase difference detection pixels adjacent in the row direction may be grouped into a single group. When the number of phase difference detection pixels is N, the number of groups during the first frame period may be (N/2−1).

Next, referring to FIG. 20B, all phase difference detection pixels may be grouped during the second frame period. Therefore, when the number of phase difference detection pixels is N, the number of groups during the second frame period may be N/2. Image sensors according to embodiments illustrated in FIGS. 20A and 20B may detect phase difference errors for two frame periods, and may generate compensation data for compensating the phase difference errors.

FIG. 21 may be a view illustrating a grouping method in an embodiment in which phase difference detection pixels are successively arranged along two or more row lines in an image sensor. Referring to FIG. 21, phase difference detection pixels included in a first row line ROW [0], and phase difference detection pixels included in a second row line ROW [1] may be grouped in a different manner to each other. Therefore, unlike embodiments illustrated in FIG. 20, an image sensor according to an embodiment illustrated in FIG. 21 may detect a phase difference error only by one frame period, and may generate compensation data for compensating the phase difference error.

FIG. 22 may be a circuit diagram illustrating a first phase difference detection pixel DPX1 and a second phase difference detection pixel DPX2 included in a single group. FIG. 23 may be a timing diagram for explaining operations of a first phase difference detection pixel DPX1 and a second phase difference detection pixel DPX2. In embodiments illustrated in FIGS. 22 and 23, a first photo-control signal PGA1 and a second photo-control signal PGA2 in each of the first phase difference detection pixel DPX1 and the second phase difference detection pixel DPX2 may have a phase difference of 180 degrees from each other.

A switch element SW1 of the first phase difference detection pixel DPX1 and a switch element SW2 of the second phase difference detection pixel DPX2 may receive the first photo-control signal PGA1 of the first phase difference detection pixel DPX1 as switch control signals SG1 and SG2. As illustrated in FIG. 23, when a phase difference error (θ) is present between photo-control signals PGA1 and PGB1 input to the first phase difference detection pixel DPX1 and photo-control signals PGA2 and PGB2 input to the second phase difference detection pixel DPX2, data obtained in each of the first phase difference detection pixel DPX1 and the second phase difference detection pixel DPX2 may be different from each other.

Therefore, a phase difference error (θ) may be detected by inputting one of the photo-control signals PGA1 and PGB1 input to the first phase difference detection pixel DPX1 to the first phase difference detection pixel DPX1 and the second phase difference detection pixel DPX2 as the switch control signals SG1 and SG2. The phase difference error (θ) may be an error between a photo-control line connected to the first phase difference detection pixel DPX1 and a photo-control line connected to the second phase difference detection pixel DPX2.

Referring again to FIG. 20, when the phase difference detection pixels are arranged along one row line ROW [0] in the image sensor, two frame periods may be required to detect phase difference errors between column lines adjacent to each other. In each of the two frame periods, the phase difference detection pixels may be grouped in different ways. When the phase difference detection pixels are arranged along the two row lines ROW [0] and ROW [1], as illustrated in FIG. 21, a phase difference error between photo-control lines adjacent to each other in only one frame period may be detected by grouping phase difference detection pixels differently in each of the two row lines ROW 101 and ROW [1]. When detecting the phase difference error between the adjacent photo-control lines, one of the photo-control lines may be selected as a reference line, and compensation data needed for compensating the phase difference error may be calculated by calculating accumulated value of the phase difference error with respect to each photo-control line, based on the reference line. For example, the compensation data may be calculated by an operation circuit or a control logic of the image sensor. Based on the compensation data, the control logic may determine the photo-control signal that the clock driver inputs to each photo-control line.

Figure 24:
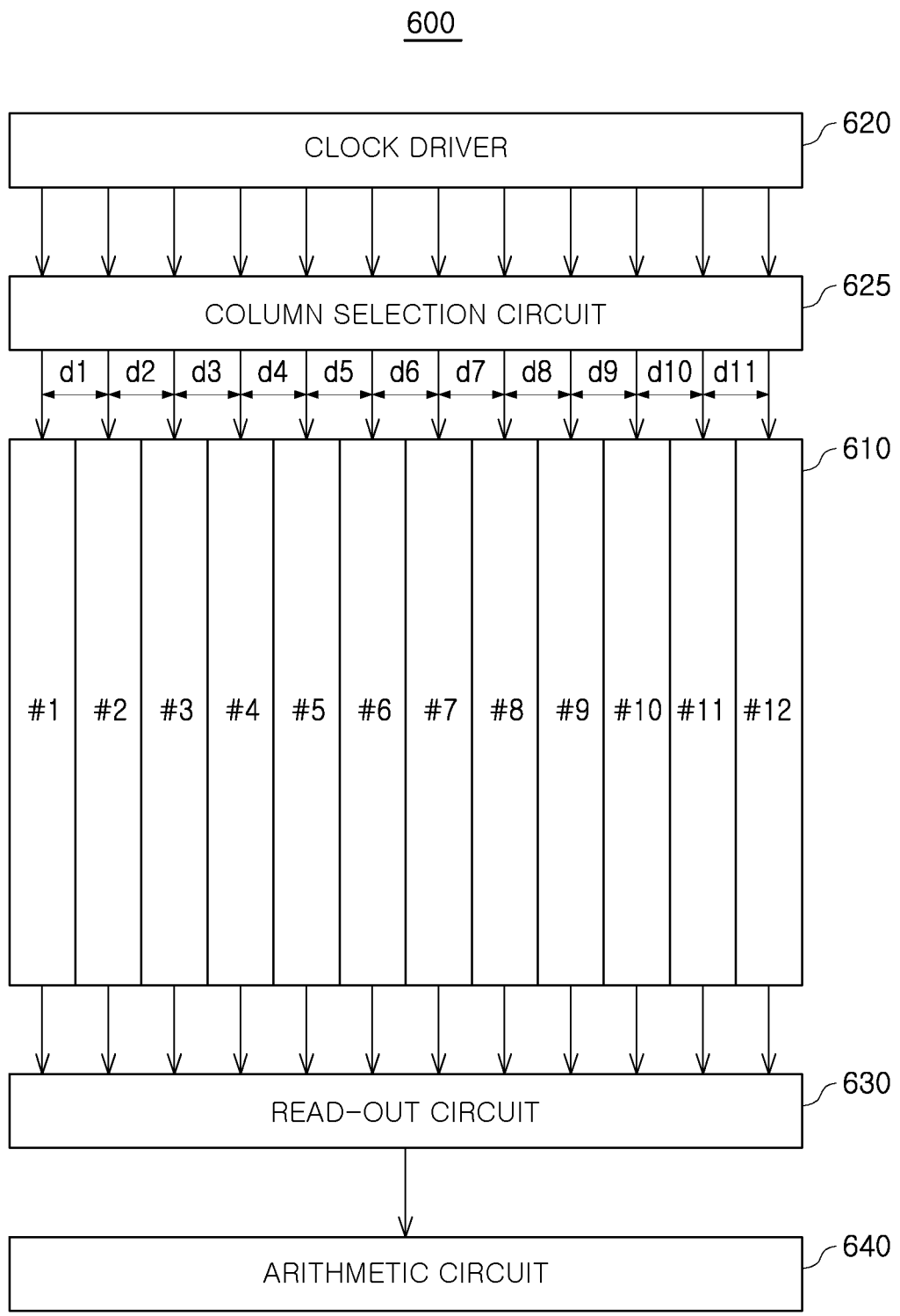
FIGS. 24 and 25 are views illustrating a phase difference detection operation using general pixels in an image sensor according to an embodiment of the present application.
Figure 25:
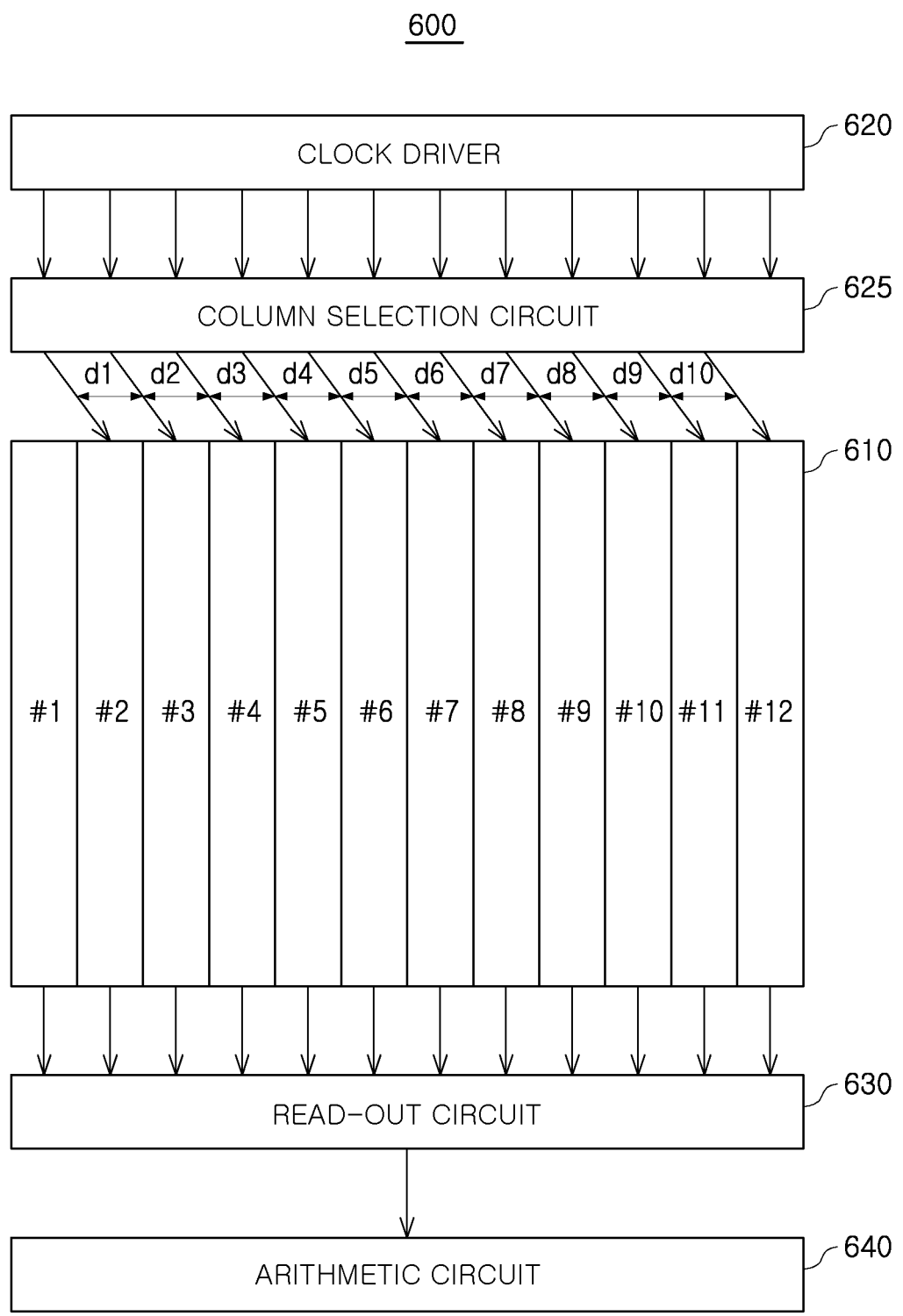

FIGS. 24 and 25 are views illustrating a phase difference detection operation using general pixels in an image sensor according to an embodiment of the present application.

In an embodiment described with respect to FIGS. 24 and 25, an image sensor 600 may include a pixel array 610, a clock driver 620, a column selection circuit 625, a read-out circuit 630, an arithmetic circuit 640, and the like. The pixel array 610 of the image sensor 600 may not include phase difference detection pixels, and the like. For example, the pixel array 610 may include only general pixels. FIGS. 24 and 25 may be views for explaining operation of the image sensor 600 in successive first frame period and second frame period, respectively.

The pixel array 610 may include a plurality of photo-control lines connected to pixels, and the plurality of photo-control lines may be connected to an output terminal of the clock driver 620, to receive clock signals. The clock signals may be photo-control signals for storing an electric charge generated from a photodiode in a phototransistor by turning the phototransistor on and off during a exposure time of the pixels. Therefore, a pair of photo-control lines may be connected to one pixel, and clock signals input to the pair of photo-control lines may have a phase difference of 90 degrees or 180 degrees.

There may be a phase difference between the photo-control signals input to different column lines. Referring first to FIG. 24, each of the photo-control lines during the first frame period may be connected to the output terminal of the clock driver 620 corresponding to the photo-control lines. In an example, a first photo-control line may be connected to a first output terminal of the clock driver 620, and a second photo-control line may be connected to a second output terminal of the clock driver 620.

The clock signals output from each of the output terminals of the clock driver 620 may have a predetermined phase difference. For example, a phase difference d1 may exist between the first photo-control line and the second photo-control line. The phase difference d1 may be a phase difference between a first clock signal output from the first output terminal of the clock driver 620 and a second clock signal output from the second output terminal of the clock driver 620. Similarly, a phase difference d2 may exist between the second clock signal and a third clock signal, and the phase difference between the first clock signal and the third clock signal may be determined as d1+d2.

Referring now to FIG. 25, output terminals of a clock driver 620 may be shifted one by one, and may be input to photo-control lines, by a column selection circuit 625 during a second frame period. An $n^{th}$ photo-control line connected to an $n^{th}$ output terminal of the clock driver 620 in a first frame period may be connected to an $(n-1)^{th}$ output terminal of the clock driver 620 during a second frame period. During the second frame period, a first photo-control line may be not connected to an output terminal of the clock driver 620. Therefore, pixels connected to the first photo-control line may be set as dummy pixels.

A second photo-control line may be connected to a second output terminal of the clock driver 620 during the first frame period, and may be connected to a first output terminal of the clock driver 620 during the second frame period. A phase difference between a first clock signal and a second clock signal output from the first output terminal and the second output terminal of the clock driver 620 may be d1. Similarly, during the first frame period and the second frame period, a third photo-control line may be connected to the third output terminal and the second output terminal of the clock driver 620, respectively. A phase difference between the second clock signal and a third clock signal output from the second output terminal and the third output terminal of the clock driver 620 may be d2. The arithmetic circuit 640 may calculate a difference between data obtained in the first frame period and data obtained in the second frame period, such that clock signals output from the clock driver 620 through output terminals, for example, a phase difference between photo-control signals may be calculated.

In an embodiment illustrated in FIGS. 24 and 25, two frame periods may be required to detect a phase difference error. The two frame periods for detecting the phase difference error may be set at the beginning of an operation in which the image sensor 600 is converted to a wakeup mode, or may be inserted every predetermined period during an operation of the image sensor 600. In an embodiment, by detecting the phase difference error by allocating two frame periods every predetermined period, it is possible to compensate for a phase difference error change in accordance with a temperature, and a threshold voltage change of the circuit elements, and to optimize performance of the image sensor 600.

Figure 26:
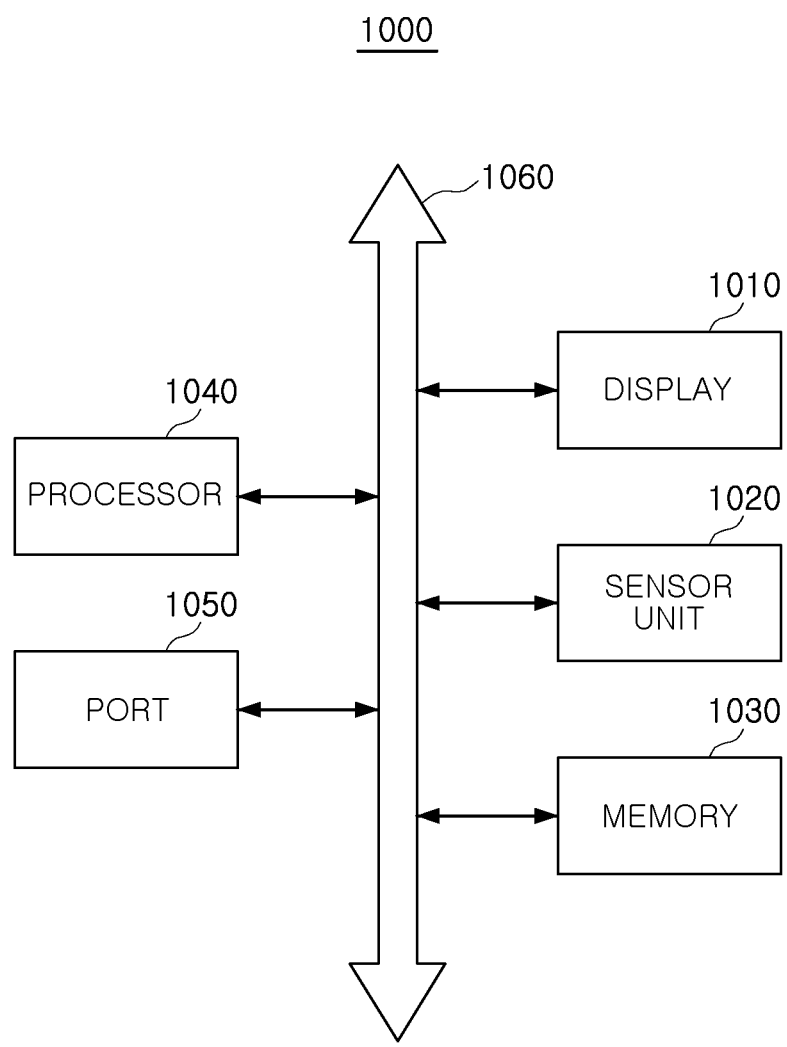
FIG. 26 is a block diagram schematically illustrating an electronic device including an image sensor according to an embodiment of the present application.

FIG. 26 is a block diagram schematically illustrating an electronic device including an image sensor according to an embodiment of the present application.

A computer device 1000 according to the embodiment illustrated in FIG. 26 may include a display 1010, an image sensor 1020, a memory 1030, a processor 1040, a port 1050, and the like. In addition, the computer device 1000 may further include a wired/wireless communications unit, a power supply unit, and the like. Among the components illustrated in FIG. 26, the port 1050 may be a device in which the computer device 1000 is provided for communicating with a video card, a sound card, a memory card, a universal serial bus (USB) device, and the like. The computer device 1000 may be a concept including a general desktop computer and laptop computer, as well as a smartphone, a tablet personal computer (PC), and a smart wearable device, and the like.

The processor 1040 may perform specific operations, commands, tasks, and the like. The processor 1040 may be a central processing unit (CPU) or a microprocessor unit (MCU), a system on chip (SoC), and the like, and may be connected to the display 1010, the sensor unit 1020, the memory device 1030, as well as other units connected to the port 1050, through a bus 1060.

The memory 1030 may be storage medium for storing data, or multimedia data for operating the computer device 1000. The memory 1030 may include a volatile memory, such as a random access memory (RAM), or a non-volatile memory, such as a flash memory. The memory 1030 may also include a solid state drive (SSD), a hard disk drive (HDD), or an optical drive (ODD) as a storage unit. The image sensor 1020 may be employed in the computer device 1000 in the form of an image sensor in accordance with various embodiments described with reference to FIGS. 1 to 25.

In an embodiment of the present application, an imaging device may include a pixel array having a plurality of pixels, each of which may include a pixel circuit operating at a predetermined timing to generate an electrical signal from electric charge. In an embodiment of the present application, performance of an imaging device may be improved by detecting a phase difference error of a clock signal input to pixel circuits, and compensating for the phase difference error.

The various and advantageous advantages and effects of the present application may be not limited to the above description, and may be more easily understood in the course of describing a specific embodiment of the present application.

While the present application has been shown and described with reference to example embodiments thereof, it will be apparent to those skilled in the art that modifications and variations could be made thereto without departing from the scope of the present application as defined by the appended claims.

What is claimed is:

1. An image sensor comprising:
a pixel array comprising a plurality of pixels,
wherein at least one of the plurality of pixels comprises a
first pixel circuit having a first photo transistor connected to a pixel node, a second pixel circuit having a second photo transistor connected to the pixel node, a switch element connected to the pixel node, and an electric charge-supplying source connected to the switch element, wherein the first photo transistor comprises a first photogate and the second photo transistor comprises a second photogate, and a controller configured to:
input a first photo-control signal to the first photogate,
input a second photo-control signal having a phase difference of 180 degrees from the first photo-control signal to the second photogate, and
turn on and turn off the switch element to supply an electric charge to the pixel node,
wherein the controller is further configured to adjust a phase of at least one of the first photo-control signal and the second photo-control signal, based on data obtained from at least one portion of the plurality of pixels.

2. The image sensor of claim 1, wherein the first pixel circuit is associated with a first lens, the second pixel circuit is associated with a second lens, a first light blocking layer is configured to block light from passing through the first lens, and the second lens is configured to allow a passage of light.

3. The image sensor of claim 1, wherein the first pixel circuit is not associated with a photodiode.

4. The image sensor of claim 1, wherein the electric charge-supplying source comprises a current mirror, wherein the current mirror comprises two transistors configured with a first gate of a first transistor connected to a second gate of a second transistor, and a reference current is configured to flow through the first transistor.

5. The image sensor of claim 1, wherein the data comprises first data corresponding to a first waveform area, second data corresponding to a second waveform area, third data corresponding to a third waveform area, and fourth data corresponding to a fourth waveform area,
wherein the controller is further configured to:
obtain the first data from the first pixel circuit after a first frame time,
obtain the second data from the second pixel circuit after the first frame time,
obtain the third data from the first pixel circuit after a second frame time,
obtain the fourth data from the second pixel circuit after the second frame time,
estimate a phase error as proportional to at least one of: i) the fourth data minus the third data and ii) the second data plus a predetermined constant minus the first data,
and
adjust the phase of at least one of the first photo-control signal and the second photo-control signal based on the estimated phase error.

6. An image sensor comprising:
a pixel array comprising first pixels disposed along a first photo-control line, and second pixels disposed along a second photo-control line, each of the first pixels comprising a first photodiode configured to generate a first electric charge and each of the second pixels comprising a second photodiode configured to generate a second electric charge, and a pixel circuit configured to generate an electrical signal using the first electric charge or the second electric charge;
a clock driver, wherein the clock driver comprises a first output terminal and a second output terminal, wherein the clock driver is configured to output a first clock signal at the first output terminal, and a second output signal at the second output terminal; and
a controller configured to:
connect the second output terminal to the second photo-control line during a first frame period,
connect the first output terminal to the second photo-control line during a second frame period following the first frame period, and
correct a phase of a clock signal input to the first photo-control line and the second photo-control line, based on data obtained in the first frame period and the second frame period.

7. The image sensor according to claim 6 wherein the controller is further configured to, during the first frame period and a third frame period following the second frame period:
connect the first output terminal to the first photo-control line, and
connect the second output terminal to the second photo-control line.

8. The image sensor according to claim 6, further comprising:
a column selection circuit configured to connect one of the first output terminal and the second output terminal to the second pixels, in response to a command from the controller.

9. The image sensor according to claim 8, wherein the column selection circuit comprises a multiplexer.

10. The image sensor according to claim 6, wherein the second frame period repeats at predetermined periods.

11. The image sensor according to claim 6, wherein the controller is further configured to, when the image sensor enters a wakeup mode, set the first frame period and the second frame period.

12. The image sensor according to claim 6, wherein the controller is further configured to set the first pixels as dummy pixels during the second frame period.

13. The image sensor according to claim 6, wherein the each of the first photo-control line and the second photo-control line comprises a pair of photo-control lines, and
wherein the clock driver is configured to input clock signals to the pair of photo-control lines, wherein the clock signals have a phase difference with respect to each other.

14. The image sensor according to claim 13, wherein the phase difference is one of 90 degrees and 180 degrees.

* * * * *